(12) United States Patent
Yoshiwara et al.

(10) Patent No.: US 10,124,969 B2
(45) Date of Patent: Nov. 13, 2018

(54) CONVEYANCE APPARATUS, IMAGE READING APPARATUS, AND IMAGE FORMING APPARATUS

(71) Applicant: CANON FINETECH NISCA INC., Saitama (JP)

(72) Inventors: Chiaki Yoshiwara, Tsukuba (JP); Takatsugu Nakamura, Kawaguchi (JP); Naruhiko Ito, Abiko (JP); Yuya Tamura, Tsukuba (JP); Jianxun Xie, Kashiwa (JP)

(73) Assignee: Canon Finetech Nisca Inc., Misato-shi (JP)

( * ) Notice: Subject to any disclaimer, the term of this patent is extended or adjusted under 35 U.S.C. 154(b) by 0 days.

(21) Appl. No.: 15/610,795

(22) Filed: Jun. 1, 2017

(65) Prior Publication Data

US 2017/0355539 A1 Dec. 14, 2017

(30) Foreign Application Priority Data

Jun. 8, 2016 (JP) .................................. 2016-114680
Jun. 8, 2016 (JP) .................................. 2016-114683
Jun. 8, 2016 (JP) .................................. 2016-114684

(51) Int. Cl.
*B65H 5/00* (2006.01)
*B65H 3/06* (2006.01)
(Continued)

(52) U.S. Cl.
CPC ................. *B65H 3/06* (2013.01); *B65H 7/06* (2013.01); *B65H 7/14* (2013.01); *G03G 15/55* (2013.01);
(Continued)

(58) Field of Classification Search
CPC .. B65H 2701/1829; B65H 2701/18292; B65H 7/18; B65H 2553/00; B65H 2301/163
See application file for complete search history.

(56) References Cited

U.S. PATENT DOCUMENTS 6,804,473 B2   10/2004   Nakamura et al.
8,061,635 B2 * 11/2011   Kim .................... B02C 18/0007
                                                    241/225
(Continued)

FOREIGN PATENT DOCUMENTS

JP    05-058512 A    3/1993
JP    05-085642 A    4/1993
(Continued)

OTHER PUBLICATIONS

Jianxun Xie et al., U.S. Appl. No. 15/611,190, filed Jun. 1, 2017.
(Continued)

*Primary Examiner* — Howard J Sanders
(74) *Attorney, Agent, or Firm* — Fitzpatrick, Cella, Harper & Scinto

(57) ABSTRACT

A conveyance apparatus includes a separation unit configured to separate and convey a sheet, a detection unit configured to detect a floating of the sheet passing through the separation unit, and a control unit configured to stop separate conveyance by the separation unit if the detection unit detects the sheet for not less than a predetermined time and/or a predetermined count.

18 Claims, 18 Drawing Sheets

(51) Int. Cl.
  *H04N 1/00* (2006.01)
  *B65H 7/14* (2006.01)
  *B65H 7/06* (2006.01)
  *G03G 15/00* (2006.01)
  *B65H 7/18* (2006.01)

(52) U.S. Cl.
  CPC ....... *G03G 15/607* (2013.01); *H04N 1/00588* (2013.01); *H04N 1/00628* (2013.01); *H04N 1/00689* (2013.01); *H04N 1/00777* (2013.01); *B65H 7/18* (2013.01); *B65H 2553/00* (2013.01); *B65H 2701/1829* (2013.01); *G03G 15/6511* (2013.01); *H04N 2201/0081* (2013.01)

(56) References Cited

U.S. PATENT DOCUMENTS

| | | | |
|---|---|---|---|
| 8,201,823 | B2 | 6/2012 | Morikawa et al. |
| 8,622,495 | B2 | 1/2014 | Korogi |
| 8,636,282 | B2 | 1/2014 | Oshiro et al. |
| 9,039,009 | B2* | 5/2015 | Oshiro ................... B65H 1/266 271/259 |
| 2005/0082734 | A1 | 4/2005 | Goto et al. |
| 2005/0231578 | A1* | 10/2005 | Tajima ................... B41J 11/009 347/104 |
| 2007/0114716 | A1* | 5/2007 | Morikawa ............ B65H 3/5261 271/258.01 |
| 2015/0035218 | A1* | 2/2015 | Kyotani ................ B65H 31/24 271/3.16 |
| 2015/0329303 | A1 | 11/2015 | Xie et al. |

FOREIGN PATENT DOCUMENTS

| | | |
|---|---|---|
| JP | 07-053120 A | 2/1995 |
| JP | 11-37737 A | 2/1999 |
| JP | 2004-107088 A | 4/2004 |
| JP | 2004-182449 A | 7/2004 |
| JP | 2007-076109 A | 3/2007 |
| JP | 2007-137655 A | 6/2007 |
| JP | 2007-150909 A | 6/2007 |
| JP | 2008-169026 A | 7/2008 |
| JP | 2009-292573 A | 12/2009 |
| JP | 2011-195221 A | 10/2011 |
| JP | 2011-195296 A | 10/2011 |
| JP | 2011-237251 A | 11/2011 |
| JP | 2013-001573 A | 1/2013 |

OTHER PUBLICATIONS

Copending, unpublished U.S. Appl. No. 15/611,190, to Jianxun Xie, dated Jun. 1, 2017.
Office Action dated Apr. 16, 2018, in Japanese Patent Application No. 2017-113617.
Office Action dated Apr. 23, 2018, in Japanese Patent Application No. 2017-113616.
Office Action dated Jul. 20, 2018, in Japanese Patent Application No. 2017-113613.

* cited by examiner

| DOCUMENT LENGTH | | SMALL SIZE | LARGE SIZE |
|---|---|---|---|
| CONTINUOUS ON TIME T | BUNDLE OF DOCUMENTS | 100 ms OR MORE | 200 ms OR MORE |
| INTERMITTENT ON COUNT N | BUNDLE OF DOCUMENTS | 3 TIMES OR MORE | 5 TIMES OR MORE |
| | FOLDED DOCUMENT | 2 TIMES OR LESS | 2 TO 4 TIMES OR LESS |

CONVEYANCE APPARATUS, IMAGE READING APPARATUS, AND IMAGE FORMING APPARATUS

BACKGROUND OF THE INVENTION

Field of the Invention

The present invention relates to a conveyance apparatus, an image reading apparatus, and an image forming apparatus.

Description of the Related Art

A feeding device included in a copying machine, a scanner, a facsimile apparatus, or the like is provided with a separation mechanism configured to separate a plurality of sheets and convey them one by one to prevent the sheets from being conveyed in an overlapping state. With such a separation mechanism, documents on a document stack table can continuously be fed one by one, and images on the documents can sequentially be read. On the other hand, a bundle of documents that are bound by a staple or the like so as to be hard to separate is sometimes erroneously stacked on the document stack table. If such a bundle of documents passes through the separation mechanism, the documents may be deformed by the separating action and damaged. As a measure against this, Japanese Patent Laid-Open No. 2004-182449 discloses an apparatus provided with a sensor that detects an abnormal shape state of a document on the document stack table.

One of the behaviors of a bundle of bound documents passing through the separation mechanism is the floating of the document on the upper side. The bundle of bound documents can be detected by detecting the floating of the document. On the other hand, a document that is originally folded in a Z shape cannot be flat and remains wavy even if it is spread out and stacked on the document stack table. Such a document can be normally read if it is passed through the separation mechanism and separated and conveyed one by one, like a normal document. If it is determined whether a document is a bundle of bound documents or not based on only the floating of the document, the folded document may erroneously be detected as a bundle of bound documents.

SUMMARY OF THE INVENTION

According to an aspect of the present invention, there is provided a conveyance apparatus comprising: a separation unit configured to separate and convey a sheet; a detection unit configured to detect a floating of the sheet passing through the separation unit; and a control unit configured to stop separate conveyance by the separation unit if the detection unit detects the sheet for not less than a predetermined time and/or a predetermined count.

Further features of the present invention will become apparent from the following description of exemplary embodiments (with reference to the attached drawings).

DESCRIPTION OF THE EMBODIMENTS

First Embodiment

Figure 1:
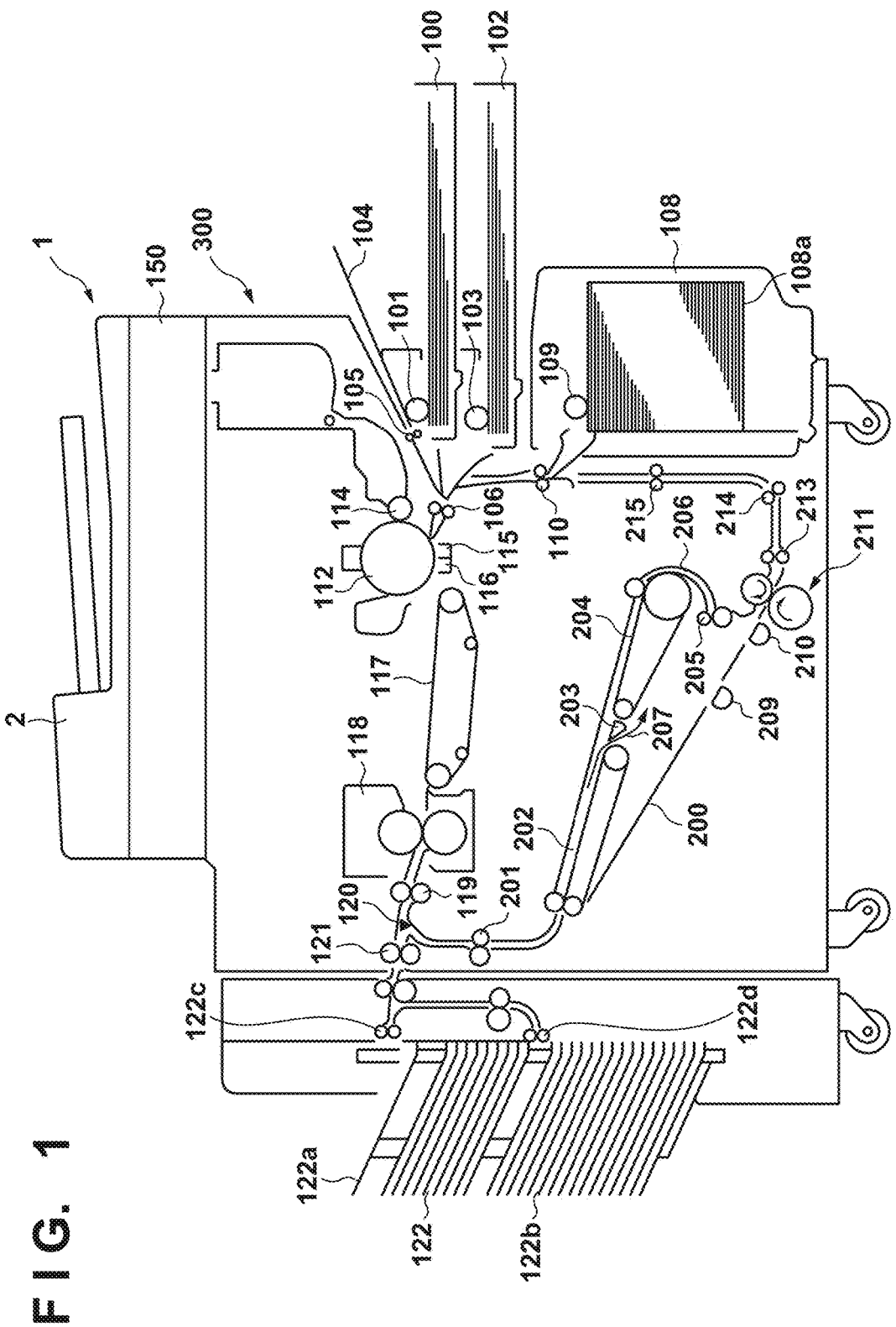
FIG. 1 is a view showing the overall arrangement of an image forming apparatus according to an embodiment of the present invention.

FIG. 1 is a view showing the overall arrangement of an image forming apparatus according to an embodiment of the present invention. The image forming apparatus includes an image reading apparatus 1, and a printing unit 300 configured to print an image read by the image reading apparatus 1 on a sheet (printing medium) such as paper.

<Printing Unit>

In this embodiment, the printing unit 300 is an image printing unit using electrostatic latent image formation. Sheets stacked and stored on an upper cassette 100 are separated and fed one by one by the action of separation grippers and a feed roller 101 and guided to a registration roller 106. A lower cassette 102 also includes separation grippers and a feed roller 103. From a manual feed guide 104, sheets are guided one by one to the registration roller 106 via a roller 105. A deck-type sheet stacking device 108 includes an inner plate 108a to be vertically moved by a motor or the like. Sheets on the inner plate 108a are separated and fed one by one by the action of separation grippers and a feed roller 109 and guided to a conveyance roller 110.

A developer 114, a transfer charger 115, and a split charger 116 are arranged around a photosensitive drum 112 to form an image forming unit. A toner image developed on the photosensitive drum 112 is transferred to a sheet conveyed by the registration roller 106. After that, the sheet is conveyed to a fixing device 118 by a conveying belt 117 to fix the image, and then conveyed to a diverter 120 by a conveyance roller 119.

To discharge the sheet, the sheet is guided to a discharge roller 121 via the diverter 120 and conveyed into a sorter 122. The sorter 122 includes a non-sort tray 122a, a sort bin tray 122b, a non-sort tray discharge roller 122c, and a sort bin tray discharge roller 122d. The non-sort tray 122a and the sort bin tray 122b vertically move to sort the sheets for each stage. Note that a discharge tray may be attached in place of the sorter.

When performing double-sided copy or multiple copy, a sheet after fixing is diverted by the diverter 120 and conveyed by a conveyance roller 201. In double-sided copy, the sheet is discharged to an intermediate tray 200 via belts 202 and 204, a path 206, and a discharge roller 205. In multiple copy, the sheet is discharged to the intermediate tray 200 by a diverter 203. The intermediate tray 200 includes half-moon rollers 209 and 210 configured to feed the sheet, a separation roller pair 211, and conveyance rollers 213, 214, and 215 configured to convey the sheet to the registration roller 106.

<Image Reading Apparatus>

Figure 2:
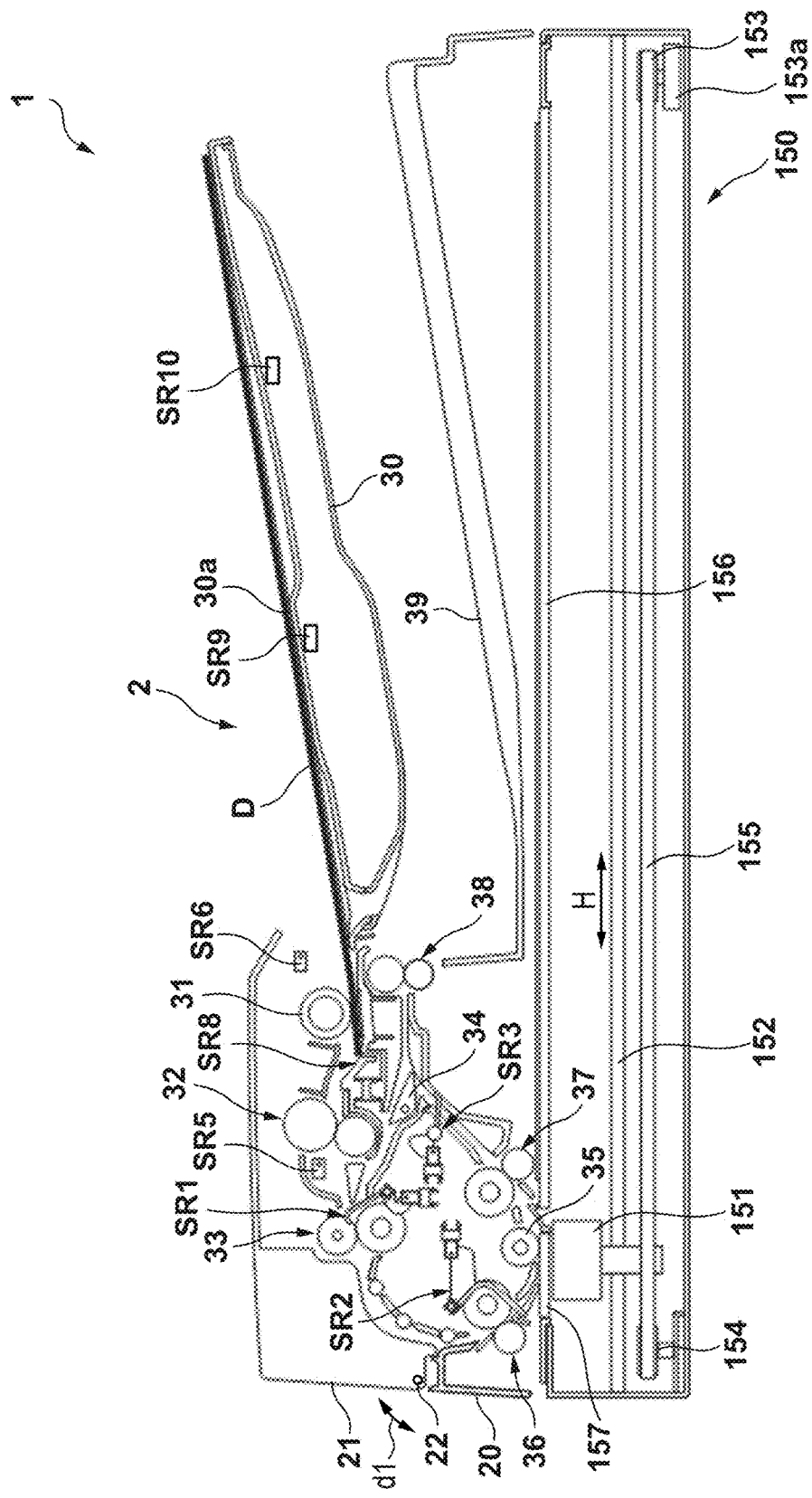
FIG. 2 is a view showing the overall arrangement of an image reading apparatus according to an embodiment of the present invention.

The arrangement of the image reading apparatus 1 will be described with reference to FIG. 2 in addition to FIG. 1. FIG. 2 is a view showing the overall arrangement of the image reading apparatus 1. The image reading apparatus 1 includes an automatic document feeder (to be referred to as a feeding device hereinafter) 2 serving as a sheet conveyance apparatus, and a reading device 150 that reads a document fed by the feeder 2. The feeding device 2 is provided to open/close with respect to the reading device 150.

The reading device 150 includes a reading unit 151, a glass document table 156, and a platen glass 157. The reading device 150 can select a normal reading mode or a flow reading mode as a document reading mode. The glass document table 156 forms a light transmitting unit for the normal reading mode. The platen glass 157 forms a light transmitting unit for the flow reading mode.

The normal reading mode is a mode in which the reading unit 151 is moved in a sub-scanning direction H under the glass document table 156, thereby scanning a document placed on the glass document table 156 and reading an image on the document. The flow reading mode is a mode in which the reading unit 151 is kept at rest at a reading position under the platen glass 157, and an image on a document is read while conveying the document such that it passes on the platen glass 157.

The reading unit 151 is, for example, a contact type image sensor, and includes line sensors arranged in the main scanning direction orthogonal to the sub-scanning direction H. As the guide structure of the reading unit 151, the reading device 150 includes a guide member 152 such as a shaft body extending in the sub-scanning direction H. The reading unit 151 can reciprocally move in the sub-scanning direction H along the guide member 152.

The reading device 150 includes a belt transmission mechanism as a drive mechanism configured to move the reading unit 151. More specifically, the reading device 150 includes a driving pulley 153 and a driven pulley 154 which are spaced apart in the sub-scanning direction H. A belt 155 is wound around them. The driving pulley 153 is rotated by a motor 153a. As the driving pulley 153 rotates, the belt 155 travels. The reading unit 151 is attached to the belt 155. The reading unit 151 moves as the belt 155 travels.

<Feeding Device>

The feeding device 2 will be described with reference to FIGS. 2, 3, and 4. The feeding device 2 conveys a sheet (document) as a reading target in the flow reading mode. In the following explanation, an upstream side and a downstream side are defined based on the sheet conveyance direction.

Figure 3:
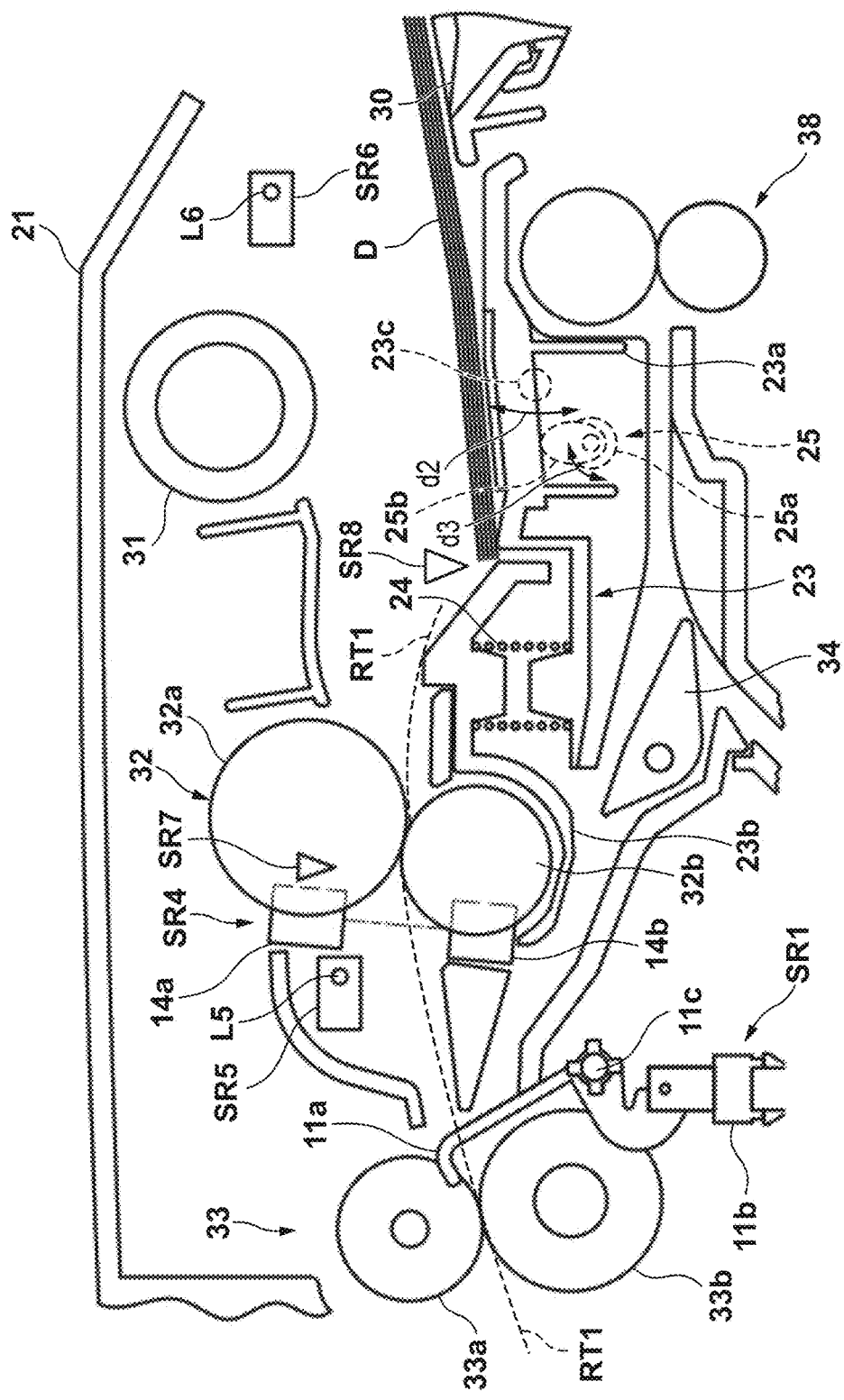
FIG. 3 is an explanatory view of an automatic document feeder.
Figure 4:
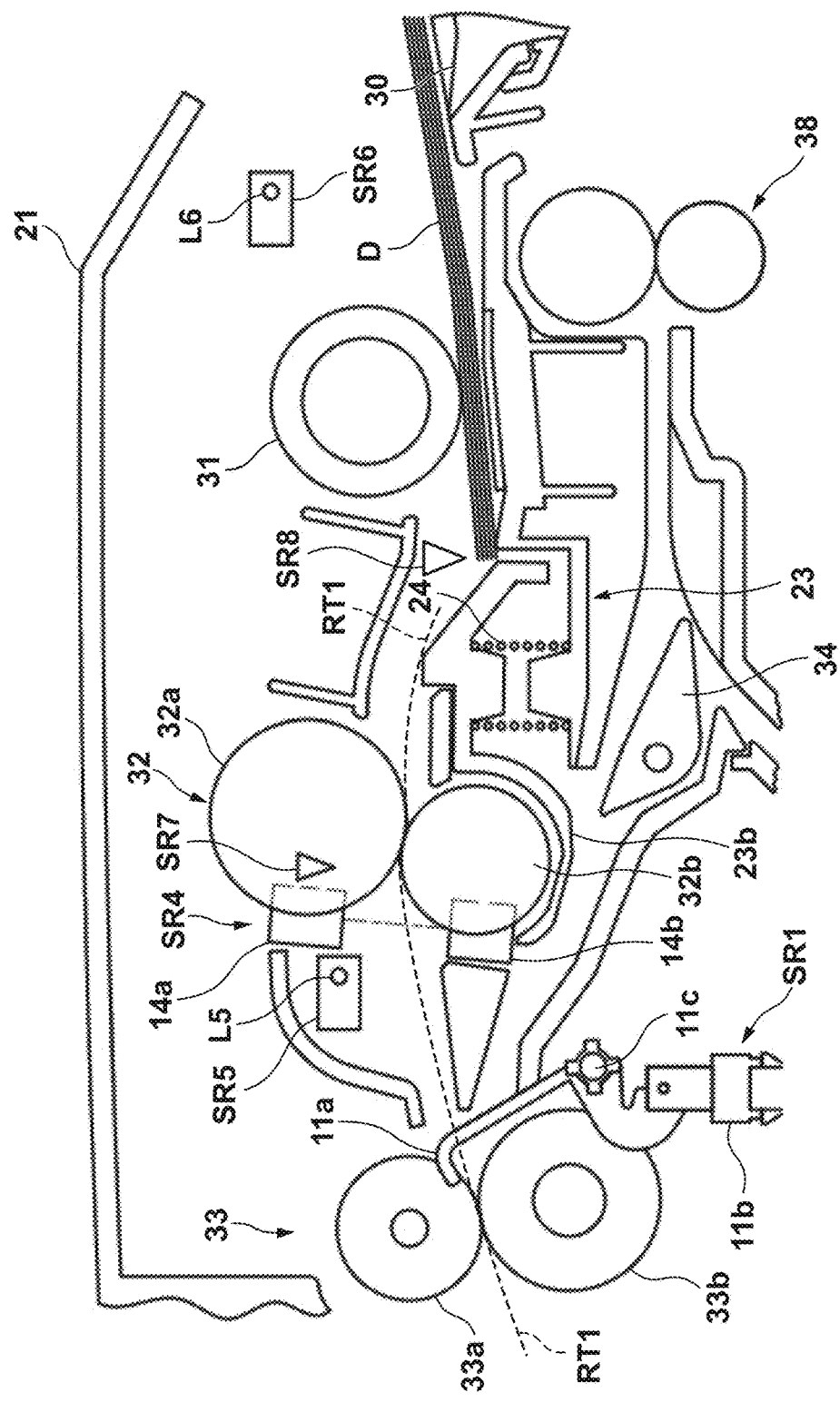
FIG. 4 is an explanatory view of the automatic document feeder.

FIGS. 3 and 4 are explanatory views of the internal arrangement of the feeding device 2. The feeding device 2 includes a stacking unit 30 on which sheets are stacked. Documents D (sheets D) that are image reading targets are stacked on a stack surface 30a of the stacking unit 30.

A pickup roller 31 conveys an uppermost document D of the documents D stacked on the stacking unit 30 to a separation unit 32. The feeding device 2 includes a lifting mechanism for the pickup roller 31. At the time of feed, the pickup roller 31 lowers and contacts the uppermost document D, as shown in FIG. 4. The uppermost document D is conveyed to the separation unit 32 by the rotation of the pickup roller 31. At all times other than the time of feed, the pickup roller 31 is lifted, as shown in FIG. 3. As the lifting mechanism, a known mechanism can be used.

The separation unit 32 is a unit arranged on the downstream side with respect to the pickup roller 31 and configured to separate and convey the documents stacked on the stacking unit 30 one by one. In this embodiment, the separation unit 32 includes a feed roller 32a and a retard roller (separation member) 32b that pressure-contacts the feed roller 32a. The feed roller 32a is rotated to convey the sheet to the downstream side. The retard roller 32b is provided with a torque limiter, and is dragged by the feed roller 32a when a predetermined load acts. If the documents are conveyed to the separation unit 32 in an overlapping state, the retard roller 32b is not dragged by the feed roller 32a. The document on the side of the feed roller 32a is conveyed, and the document on the side of the retard roller 32b is not conveyed. The documents are thus separated and conveyed one by one.

Note that as the arrangement of the separation unit 32, an arrangement that inputs a driving force to the retard roller 32b via the torque limiter to reverse the retard roller 32b or an arrangement that uses another separation member such as a separation pad in place of the retard roller 32b can also be employed.

The retard roller 32b is rotatably supported by a holder 23. The holder 23 includes a main body portion 23a and a support portion 23b connected to the main body portion 23a and having the retard roller 32b mounted on it. A coil spring 24 intervenes between the main body portion 23a and the support portion 23b. The retard roller 32b is brought into pressure-contact with the feed roller 32a by the biasing force of the coil spring 24.

The holder 23 is supported to be swingable in the direction of an arrow d2 about an axis 23c. The feeding device 2 includes a driving unit 25 capable of separating the feed roller 32a and the retard roller 32b. The driving unit 25 includes a motor 25a and a cam 25b that is caused to pivot by the motor 25a. As the cam 25b pivots, the holder 23 swings about the axis 23c. Unusually, the holder 23 is held at a position where the retard roller 32b pressure-contacts the feed roller 32a. If a paper jam or the like occurs, the driving unit 25 makes the holder 23 pivot counterclockwise in FIG. 3 to separate the retard roller 32b from the feed roller 32a. It is therefore possible to easily extract the jammed document to the side of the stacking unit 30.

A conveyance unit 33 is arranged on the downstream side with respect to the separation unit 32 and conveys a sheet passing through the separation unit 32. The conveyance unit 33 includes registration rollers 33a and 33b that are conveyance rollers. They pressure-contact each other to form a nip portion. One of the registration rollers 33a and 33b is a driving roller, and the other is a driven roller. The leading edge of a document is abutted against the nip portion in a state in which the registration rollers 33a and 33b are at rest, thereby correcting a skew of the document.

A platen roller 35 is arranged to face the platen glass 157. A read roller pair 36 is arranged on the upstream side of the platen roller 35, and a read roller pair 37 is arranged on the downstream side. The document passing through the conveyance unit 33 is conveyed by the read roller pair 36, the platen roller 35, and the read roller pair 37 so as to pass on the platen glass 157.

A reversing discharge roller pair 38 conveys the document passing through the read roller pair 37 to a discharge unit 39. The document is stacked on the discharge unit 39. A flapper 34 that switches the conveyance path is provided between the read roller pair 37 and the reversing discharge roller pair 38.

Detection units SR1 to SR7 included in the feeding device 2 will be described next. The detection unit SR1 is a registration sensor arranged between the separation unit 32 and the conveyance unit 33 at a point before the conveyance unit 33. The detection unit SR1 includes a flag 11a that freely pivots about an axis 11c, and a photosensor (photointerrupter) that detects the pivot of the flag 11a. The flag 11a is biased clockwise in FIG. 3 by a spring (not shown). If the document arrives at the conveyance unit 33, the flag 11a is pushed by the document and pivots, and the arrival of the document at the conveyance unit 33 can be detected. Then, the conveyance unit 33 is controlled based on the detection result of the detection unit SR1 to correct the skew of the document. More specifically, the rotation of the conveyance unit 33 is stopped until a predetermined time elapses from document detection by the detection unit SR1. After the elapse of the predetermined time, control is done to rotate the conveyance unit 33 to do conveyance, thereby correcting the skew of the document.

The detection units SR2 and SR3 are sensors having the same arrangement as the detection unit SR1. The detection unit SR2 is a read sensor that detects that the leading edge of the document passes through the read roller pair 36. The start/end of reading of the reading unit 151 is controlled based on the detection result of the detection unit SR2. The detection unit SR3 is a discharge sensor that detects that the leading edge of the document reaches a point before the flapper 34.

The detection unit SR4 is a sensor that detects multi feed of documents, and is sometimes called a multi feed detection sensor. The detection unit SR4 detects multi feed of documents on the downstream side of a sheet-conveying position of the separation unit 32 and on the upstream side of a sheet-conveying position of the conveyance unit 33. In this embodiment, the detection unit SR4 is an ultrasonic sensor. A transmitter 14a and a receiver 14b are arranged on both sides of a conveyance path RT1. If multi feed is detected by the detection unit SR4, conveyance of the document D is stopped.

Each of the detection units SR5 and SR6 is a sensor that detects a deformation of the sheet, and is sometimes called a deformation detection sensor. Details will be described later. The detection unit SR7 is a post-separation sensor that is arranged immediately after the nip portion of the separation unit 32 and detects that the leading edge of the document passes through the separation unit 32. The detection unit SR7 can be, for example, a sensor having the same arrangement as the detection unit SR1.

The detection unit SR8 is a document detection sensor that detects whether the document D is stacked on the stacking unit 30. In this embodiment, its detection position is set on the downstream side of a sheet-conveying-conveying position of the pickup roller 31 and on the upstream side of the sheet-conveying-conveying position of the separation unit 32. The detection unit SR8 can be, for example, a sensor having the same arrangement as the detection unit SR1.

Each of the detection units SR9 and SR10 is a document length sensor that detects the length of the document D. In this embodiment, their detection positions are set apart in the conveyance direction in the stacking unit 30. The detection units SR9 and SR10 are, for example, reflection photosensors. As for the document length, for example, if both the detection units SR9 and SR10 detect the document D, the size can be determined to be large. If only the detection unit SR9 detects the document D, the size can be determined to be small.

The feeding device 2 includes a main body unit 20 and a cover member 21. The cover member 21 covers the above-described components such as the pickup roller 31, the separation unit 32, and the conveyance unit 33 from above. The cover member 21 is connected to the main body unit 20 via a hinge portion 22 and freely pivots in the direction of an arrow d1 about the hinge portion 22 serving as the pivot center. Accordingly, as the cover member 21 pivots, the feeding device 2 can be opened/closed, and maintenance can be done if a paper jam or the like occurs. In addition, the pickup roller 31, the feed roller 32a, and the like are supported by the cover member 21. When the cover member 21 is opened, these components move together with the cover member 21. As a result, the maintainability further improves.

An example of the operation of the feeding device 2 in the flow reading mode will be described next. If the detection unit SR8 detects the document D placed on the stacking unit 30 by the user, the document D is pulled into the apparatus by the pickup roller 31 and conveyed to the separation unit 32. Even if a plurality of documents are conveyed in a multi feed state, the separation unit 32 separates the documents and conveys them one by one to the conveyance unit 33.

If the detection unit SR1 detects the leading edge of the document D, the leading edge of the document D conveyed by the separation unit 32 is abutted against the conveyance unit 33 that has stopped rotating, thereby correcting a skew of the document D. The detection unit SR1 can be used not only to measure the timing of correcting the skew of the document D but also to measure the feed timing for the next document by the pickup roller 31 in accordance with detection of the trailing edge of the document D.

The document D that has undergone the skew correction is conveyed to the read roller pair 36. Image reading by the reading unit 151 is started at a reading timing based on detection of the leading edge of the document D by the detection unit SR2. At this time, the reading unit 151 reads the image of the document D that is conveyed in a state in which the floating amount from the upper surface of the platen glass 157 is regulated by the platen roller 35 that rotates at a predetermined rotational speed.

The document D is conveyed by the read roller pairs 36 and 37 while its image is read by the reading unit 151. When reading only one surface of the document D, the document D that has undergone the image reading is conveyed by the read roller pair 37 to the reversing discharge roller pair 38 and discharged to the discharge unit 39.

When reading both surfaces of the document D, after the reading of the first surface, the reversing discharge roller pair 38 that is discharging the document D is stopped. After that, the reversing discharge roller pair 38 is rotated in the reverse direction to bring the document D back into the apparatus. Then, the flapper 34 switches the conveyance path to a reversing conveyance path RT2 to feed the document D to the conveyance path RT1 again. The reading unit 151 reads the second surface in accordance with the same procedure as described above. After that, the document is discharged to the discharge unit 39, as in the single-sided reading.

<Detection of Sheet Deformation>

Figure 5:
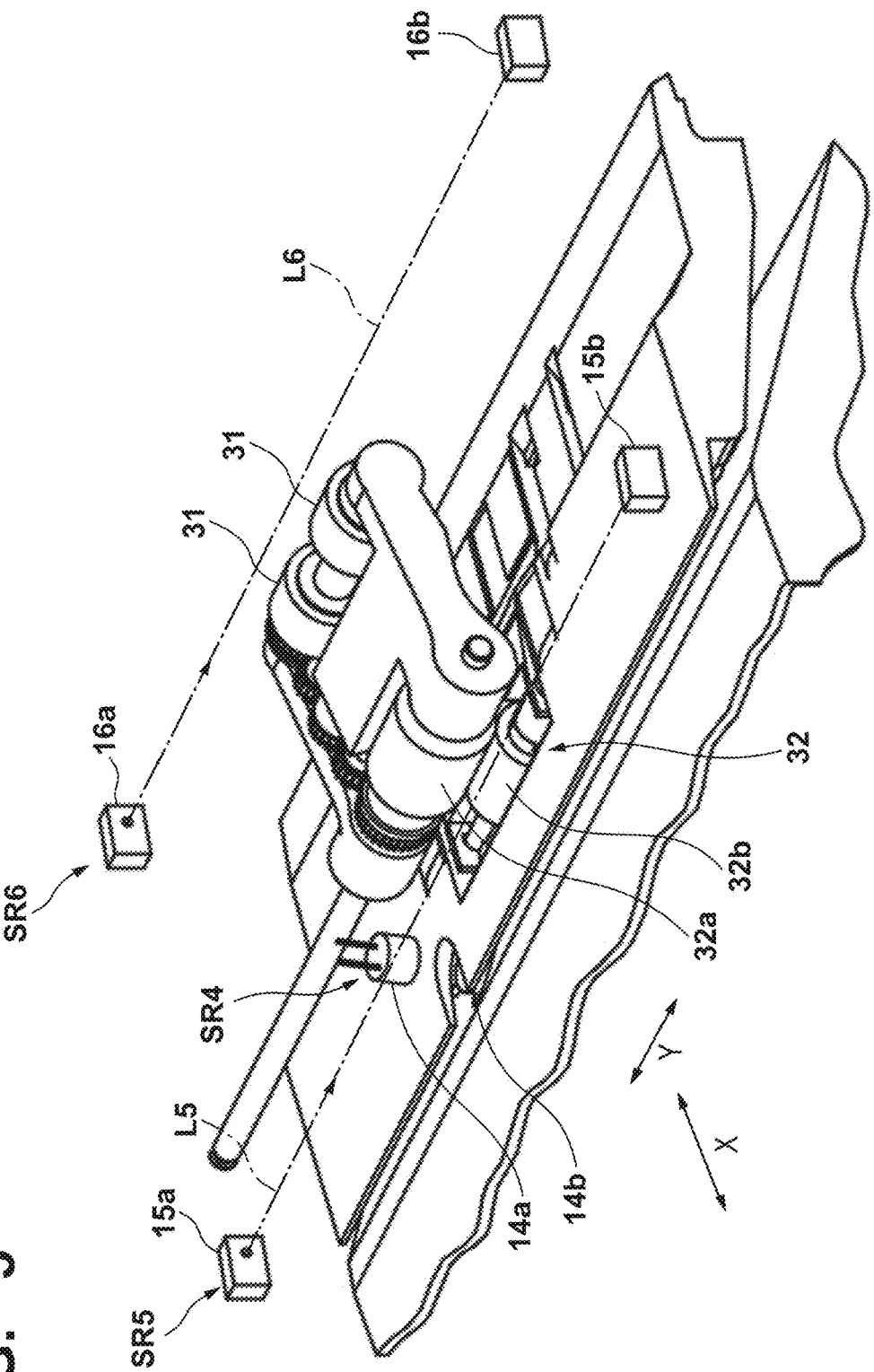
FIG. 5 is an explanatory view of deformation detection units.

In this embodiment, the detection units SR5 and SR6 are arranged to detect a deformation, in particular, floating of the document which occurs when a bundle of documents bound by a staple or the like passes through the separation unit 32. The floating of the sheet means a deformation of the sheet in a height direction at a side of the feed roller 32a of the separation unit 32. The detection units SR5 and SR6 are arranged so as to detect a sheet at a level higher than a level where a conveyed sheet passes in a normal state, and therefore the detection units SR5 and SR6 detect a sheet conveyed by the separation unit 32 in an abnormal state. FIG. 5 is an explanatory view of the detection units SR5 and SR6. Referring to FIG. 5, an arrow X represents the conveyance direction of the document (the path direction of the conveyance path RT1), and an arrow Y represents the widthwise direction of the conveyance path RT1.

The detection unit SR5 is a sensor that detects the deformation of the sheet passing through the separation unit 32 at a position on the downstream side of the sheet-conveying position of the separation unit 32 and on the upstream side of the sheet-conveying position of the conveyance unit 33. Thus, the detecting position of the detection sensor SR5 is set at a position on the downstream side of the sheet-conveying position of the separation unit 32 and on the upstream side of the sheet-conveying position of the conveyance unit 33. In this embodiment, the detection unit SR5 detects the deformation of the sheet at a position closer to the separation unit 32 than the conveyance unit 33. This enables quicker detection of the sheet deformation that occurs on the downstream side of the sheet-conveying position of the separation unit 32.

The detection unit SR6 is a sensor that detects the deformation of the sheet passing through the sheet-conveying position of the separation unit 32 at a position on the upstream side of the sheet-conveying position of the separation unit 32. Thus, the detecting position of the detection unit SR6 is set at a position on the downstream side of the sheet-conveying position of the separation unit 32. In this embodiment, the detection unit SR6 is arranged to detect the deformation of the sheet at a position on the upstream side of the sheet-conveying position of the pickup roller 31. It is therefore possible to more quickly detect the sheet deformation that occurs on the upstream side of the sheet-conveying position of the separation unit 32.

In this embodiment, the detection units SR5 and SR6 are transmission-type photosensors. However, these sensors may be sensors of another type. For example, they may be flag-type sensors like the detection unit SR1.

The detection unit SR5 includes a light-emitting portion 15a and a light-receiving portion 15b. The light-emitting portion 15a and the light-receiving portion 15b are arranged on one lateral side and the other lateral side of the conveyance path RT1 in the widthwise direction Y, and face each other. The light-emitting portion 15a and the light-receiving portion 15b are arranged at an interval larger than the width of a document in the maximum size. An optical path L5 from the light-emitting portion 15a to the light-receiving portion 15b is set to cross the conveyance path RT1. In this embodiment, the optical path L5 is parallel to the widthwise direction Y. However, the optical path L5 may tilt with respect to the widthwise direction Y.

The optical path L5 is set at a position apart upward from the conveyance plane of the conveyance path RT1. This can prevent a document that is normally conveyed from being erroneously detected.

In this embodiment, the detection unit SR6 is formed like the detection unit SR5. The detection unit SR6 includes a light-emitting portion 16a and a light-receiving portion 16b. The light-emitting portion 16a and the light-receiving portion 16b are arranged on one lateral side and the other lateral side of the stacking unit 30 in the widthwise direction Y, and face each other. The light-emitting portion 16a and the light-receiving portion 16b are arranged at an interval larger than the width of a document in the maximum size. An optical path L6 from the light-emitting portion 16a to the light-receiving portion 16b is set to cross the stack surface 30a of the stacking unit 30. In this embodiment, the optical path L6 is parallel to the widthwise direction Y. However, the optical path L6 may tilt with respect to the widthwise direction Y.

The optical path L6 is set at a position apart upward from the stack surface 30a and set at a position higher than the upper limit height of stacked documents. This can prevent a document that is normally conveyed from being erroneously detected.

Examples of document deformation detectable by the detection units SR5 and SR6 will be described next. Types of a bundle of documents bound by staples and examples of deformation will be described first with reference to FIGS. 6A to 6E and FIGS. 7A to 8B. In FIGS. 6A to 6E, arrows indicate the document conveyance direction.

Figure 6A:
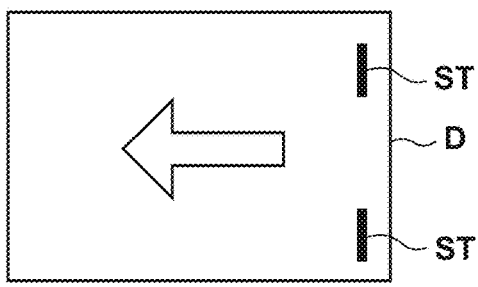
FIGS. 6A to 6E are views showing examples of document binding by staples.
Figure 7A:
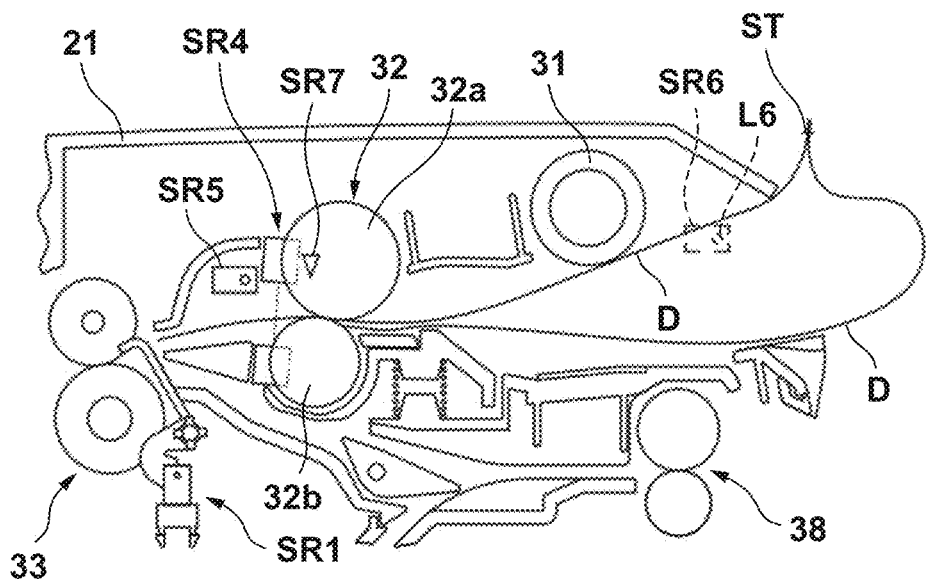
FIGS. 7A and 7B are views showing an example of a document deformation.

FIG. 6A shows a bundle of documents bound by a plurality of staples ST along the edge on the trailing edge side in the conveyance direction. FIG. 7A shows the behavior of the bundle of documents passing through the separation unit 32. In the bundle of documents bound on the trailing edge side, the conveyance of the document D (uppermost document) on the side of the feed roller 32a progresses, and the conveyance of the document D on the side of the retard roller 32b stops due to the separation action of the separation unit 32 on the leading edge side. For this reason, the trailing edge side of the bundle of documents bound by the staples ST floats in a loop shape. In this example, since the bundle of documents is bound by the plurality of staples ST along the edge, the trailing edge side of the bundle of documents floats in a wavy pattern almost evenly in the widthwise direction. Such a deformation can be detected by the detection unit SR6.

Figure 6C:
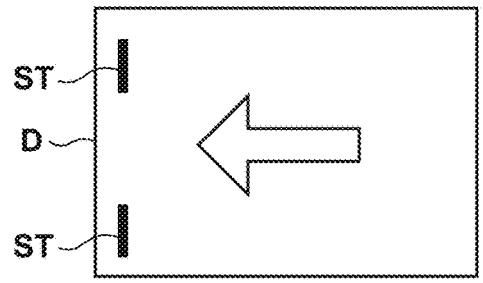
Figure 6B:
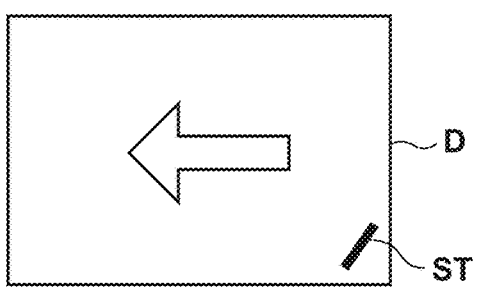
Figure 7B:
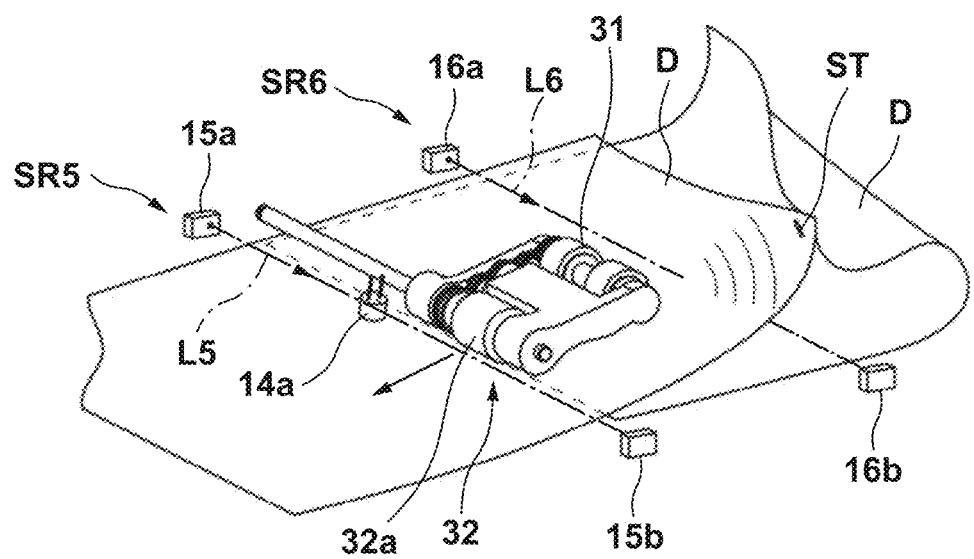

FIG. 6B shows a bundle of documents bound by the staple ST at one corner on the trailing edge side in the conveyance direction. FIG. 7B shows the behavior of the bundle of documents passing through the separation unit 32. In the bundle of documents bound on the trailing edge side, the conveyance of the document D (uppermost document) on the side of the feed roller 32a progresses, and the conveyance of the document D on the side of the retard roller 32b stops due to the separation action of the separation unit 32 on the leading edge side. For this reason, the trailing edge side of the bundle of documents bound by the staple ST floats in a loop shape. In this example, since the bundle of documents is bound by the staple ST at one corner, the trailing edge side of the bundle of documents floats unevenly in the widthwise direction, and the side of the staple ST floats higher. Such a deformation can be detected by the detection unit SR6.

Figure 8A:
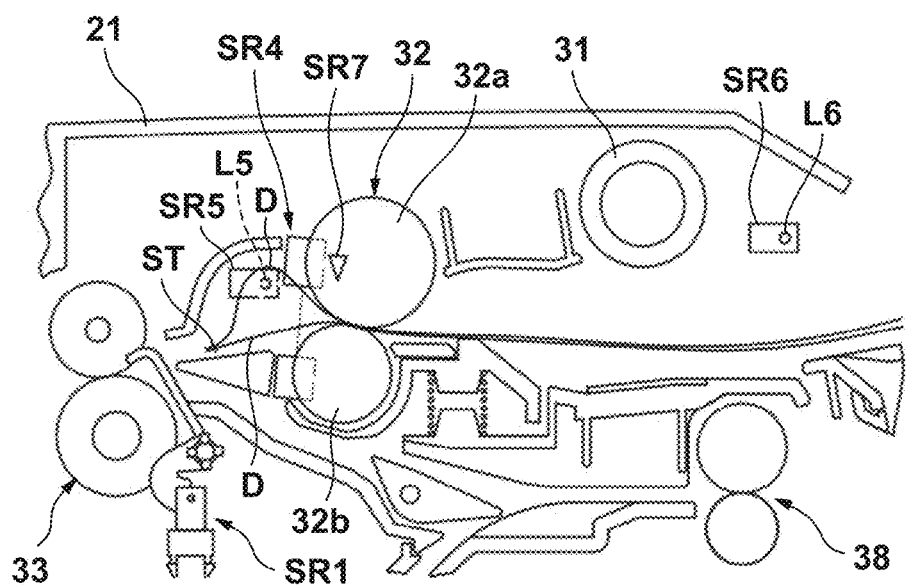
FIGS. 8A and 8B are views showing an example of a document deformation.

FIG. 6C shows a bundle of documents bound by the plurality of staples ST along the edge on the leading edge side in the conveyance direction. FIG. 8A shows the behavior of the bundle of documents passing through the separation unit 32. For the bundle of documents bound on the leading edge side, the separation action of the separation unit 32 tends to be effective after the staples ST pass through the separation unit 32. Additionally, on the trailing edge side of the bundle of documents, the documents are not restrained. For this reason, the leading edge side of the bundle of documents bound by the staples ST floats in a loop shape on the downstream side of the sheet-conveying position of the separation unit 32. In this example, since the bundle of documents is bound by the plurality of staples ST along the edge, the leading edge side of the bundle of documents floats in a wavy pattern almost evenly in the widthwise direction. Such a deformation cannot be detected by the detection unit SR6. In this embodiment, however, the detection unit SR5 or SR4 can detect the deformation.

Figure 6D:
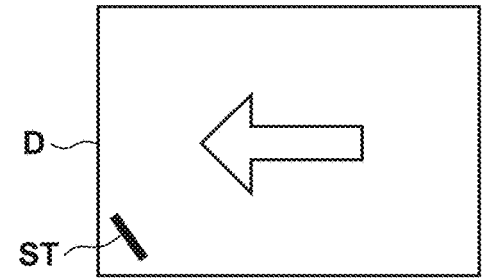
Figure 8B:
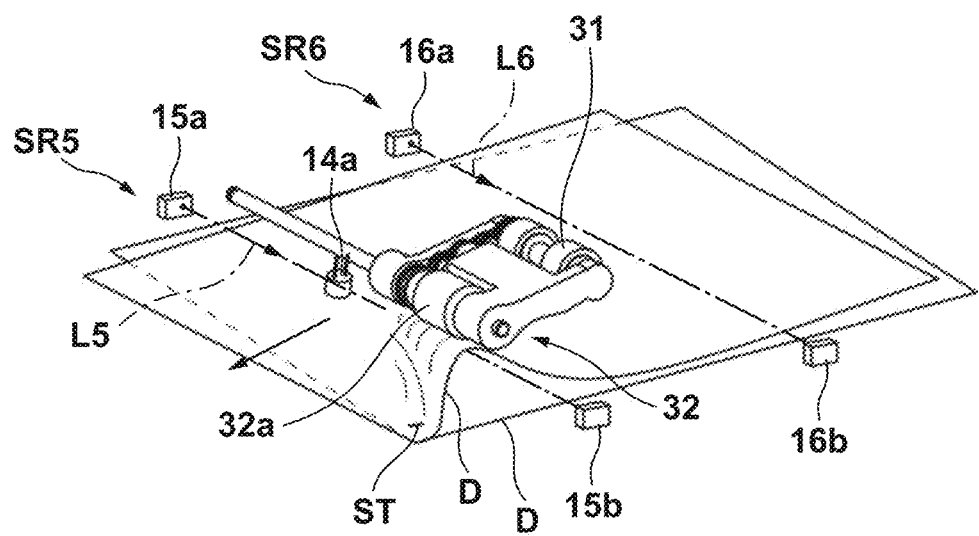

FIG. 6D shows a bundle of documents bound by the staple ST at one corner on the leading edge side in the conveyance direction. FIG. 8B shows the behavior of the bundle of documents passing through the separation unit 32. As in the example shown in FIGS. 6C and 8A, the leading edge side of the bundle of documents bound by the staple ST floats in a loop shape on the downstream side of the sheet-conveying position of the separation unit 32. In this example, since the bundle of documents is bound by the staple ST at one corner, the leading edge side of the bundle of documents floats unevenly in the widthwise direction, and the side of the staple ST floats higher. Such a deformation cannot be detected by the detection unit SR6. The detection unit SR4 can detect the deformation in some cases. However, depending on the deformation pattern, the document D does not overlap at the detection position of the detection unit SR4, and the deformation may be undetectable. In this embodiment, however, the detection unit SR5 can detect the deformation.

Figure 6E:
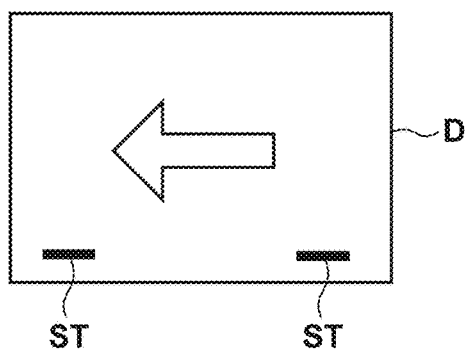

FIG. 6E shows a bundle of documents bound by the staples ST on a lateral side in the conveyance direction. The behavior of the bundle of documents passing through the separation unit 32 is the same as in the example of FIG. 8B. The detection unit SR5 can detect the deformation.

As described above, in this embodiment, since the detection unit SR5 is provided, the bundle of documents bound on the leading edge side in the conveyance direction can be detected more quickly.

<Determination of Bundle of Bound Documents and Folded Document>

Figure 10A:
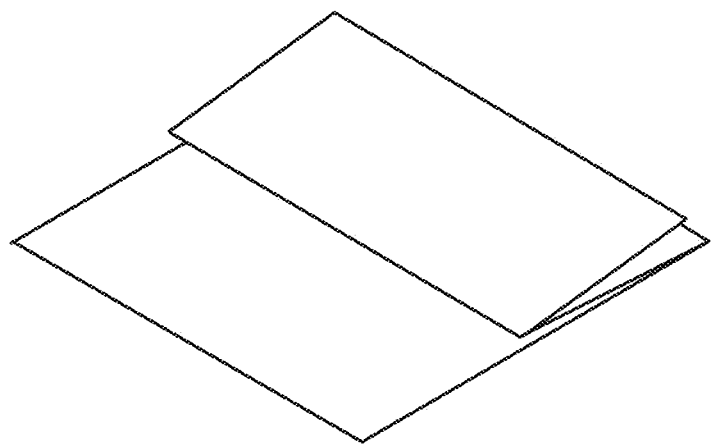
FIGS. 10A and 10B are explanatory views of a folded document.
Figure 10B:
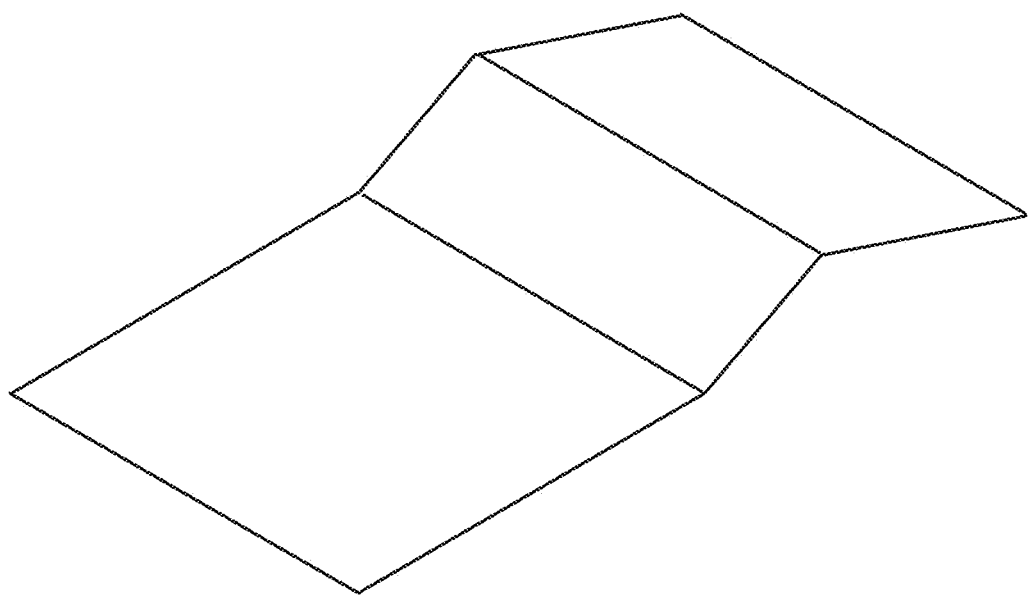

A document folded in a Z shape cannot be flat and remains wavy even if it is spread out and stacked on the stacking unit 30. FIGS. 10A and 10B show an example of such a folded document. FIG. 10A shows a document folded in a Z shape, and FIG. 10B shows a state in which the document shown in FIG. 10A is spread out. Even in the spread state as shown in FIG. 10B, a mountain-shaped crease remains.

Figures 11A, 11B:
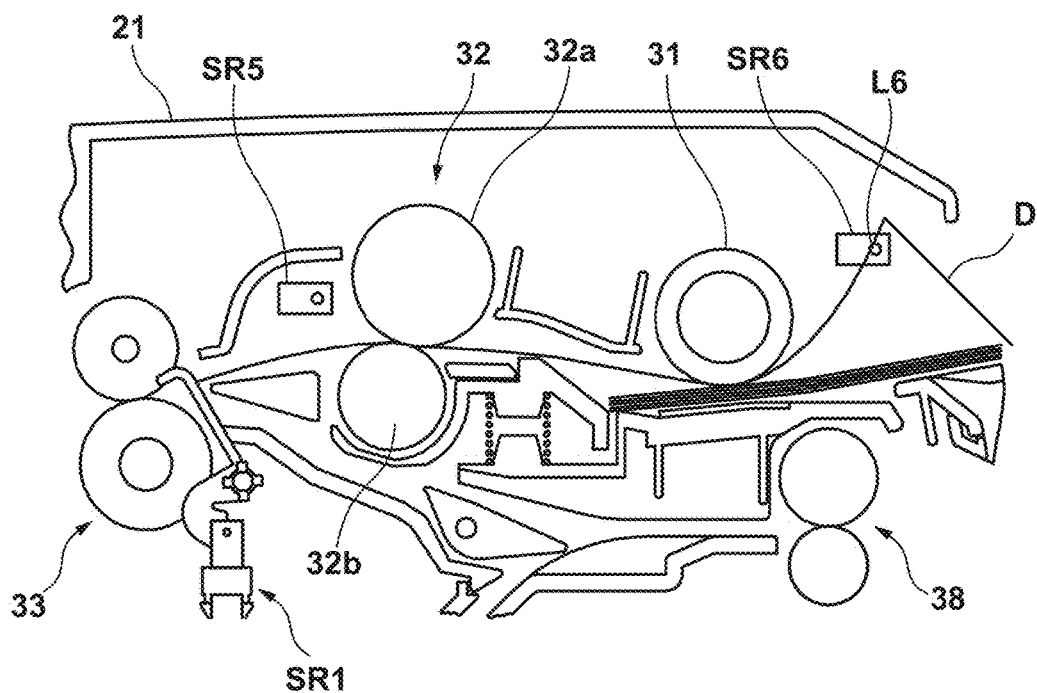
FIG. 11A is a view showing the feed form of a folded document.
FIG. 11B is a view showing an example of conditions to discriminate between a bundle of documents and a folded document.

Such a folded document normally passes through the separation unit 32 without any problem. However, if the folded document is fed, the mountain portion passes on the optical path L6 of the detection sensor SR6, as shown in FIG. 11A, and is detected by the detection sensor SR6. Hence, if it is determined that the document is a folded document only based on the detection of the floating of the document by the detection sensor SR6, a detection error can occur.

To prevent this, a bundle of bound documents and a folded document are discriminated based on their behaviors. FIG. 11B is a view showing an example of conditions to discriminate between a bundle of bound documents and a folded document. The continuous time (continuous ON time T) of detection by the detection sensor SR6 changes between the bundle of bound documents and the folded document. More specifically, in the bundle of bound documents, the document on the upper side floats, as shown in FIGS. 7A and 7B. Additionally, by the action of the separation unit 32, the floating state is maintained on the upstream side of the sheet-conveying position of the separation unit 32. Hence, the detection time of the detection sensor SR6 becomes relatively long. On the other hand, in the folded document, conveyance of the document is not impeded by the separation unit 32. Since the mountain portion passes through the optical path L6 in accordance with feeding, the detection time of the detection sensor SR6 becomes relatively short. It is therefore possible to make a discrimination between the bundle of bound documents and the folded document based on the continuous ON time T of the detection unit SR6.

The continuous ON time T serving as a threshold to discriminate between the bundle of bound documents and the folded document can be changed depending on the document conveyance speed, the document length, or the document type (thickness or the like). In the example shown in FIG. 11B, the time serving as the threshold to discriminate between the bundle of documents and the folded document is changed depending on the document length. For a small size, if the continuous ON time T of the detection unit SR6 is 100 ms or more, the document is determined to be a bundle of bound documents. If the continuous ON time T is less than 100 ms, the document is determined to be a folded document. For a large size, if the continuous ON time T of the detection unit SR6 is 200 ms or more, the document is determined to be a bundle of bound documents. If the continuous ON time T is less than 200 ms, the document is determined to be a folded document. The size of the document stacked on the stacking unit 30 can be determined based on the detection results of the detection units SR9 and SR10, as described above.

In addition, the detection count (intermittent ON count N) of the detection sensor SR6 per unit time changes between the bundle of bound documents and the folded document. More specifically, in the bundle of bound documents, the document on the upper side floats, as shown in FIGS. 7A and 7B. Additionally, by the action of the separation unit 32, the floating state is maintained on the upstream side of the sheet-conveying position of the separation unit 32. At this time, the floating portion vibrates in a swinging manner due to the separation operation of the separation unit 32 for the bundle of documents. For this reason, the floating portion tends to cross the optical path L6 a plurality of times, and the count of repetitive ON-OFF of the detection sensor SR6 becomes relatively large. On the other hand, in the folded document, since the separation unit 32 performs a normal separation operation, the vibration factor is small. Since the climbing and descending portions of the mountain pass through the optical path L6, the detection count is 2. For this reason, if the detection count of the detection sensor SR6 is 2 or less, the document can be determined to be a folded document. If the detection count is 3 or more, the document can be determined to be a bundle of bound documents. It is therefore possible to make a discrimination between the bundle of bound documents and the folded document based on the intermittent ON count N of the detection unit SR6.

The intermittent ON count N serving as a threshold to discriminate between the bundle of bound documents and the folded document can be changed depending on the document conveyance speed, the document length, or the document type (thickness or the like). In the example shown in FIG. 11B, the count serving as the threshold to discriminate between the bundle of documents and the folded document is changed depending on the document length. For a folded document whose document length is long (document size is large), the detection count may be large because of a swing or floating on the upstream side of the mountain portion. Even so, the detection count is probably about 4. Hence, for a large document size, if the detection count N of the detection sensor SR6 is 2 to 4 or less, the document is determined to be a folded document. If the detection count N is 5 or more, the document can be determined to be a bundle of bound documents.

When a bundle of documents and a folded document are discriminated in this way, it is possible to accurately detect a bundle of bound documents and execute corresponding control (for example, feeding stop). Note that such a discrimination between a bundle of documents and a folded document can also be applied to the detection result of the detection sensor SR5.

<Control>

Figure 9:
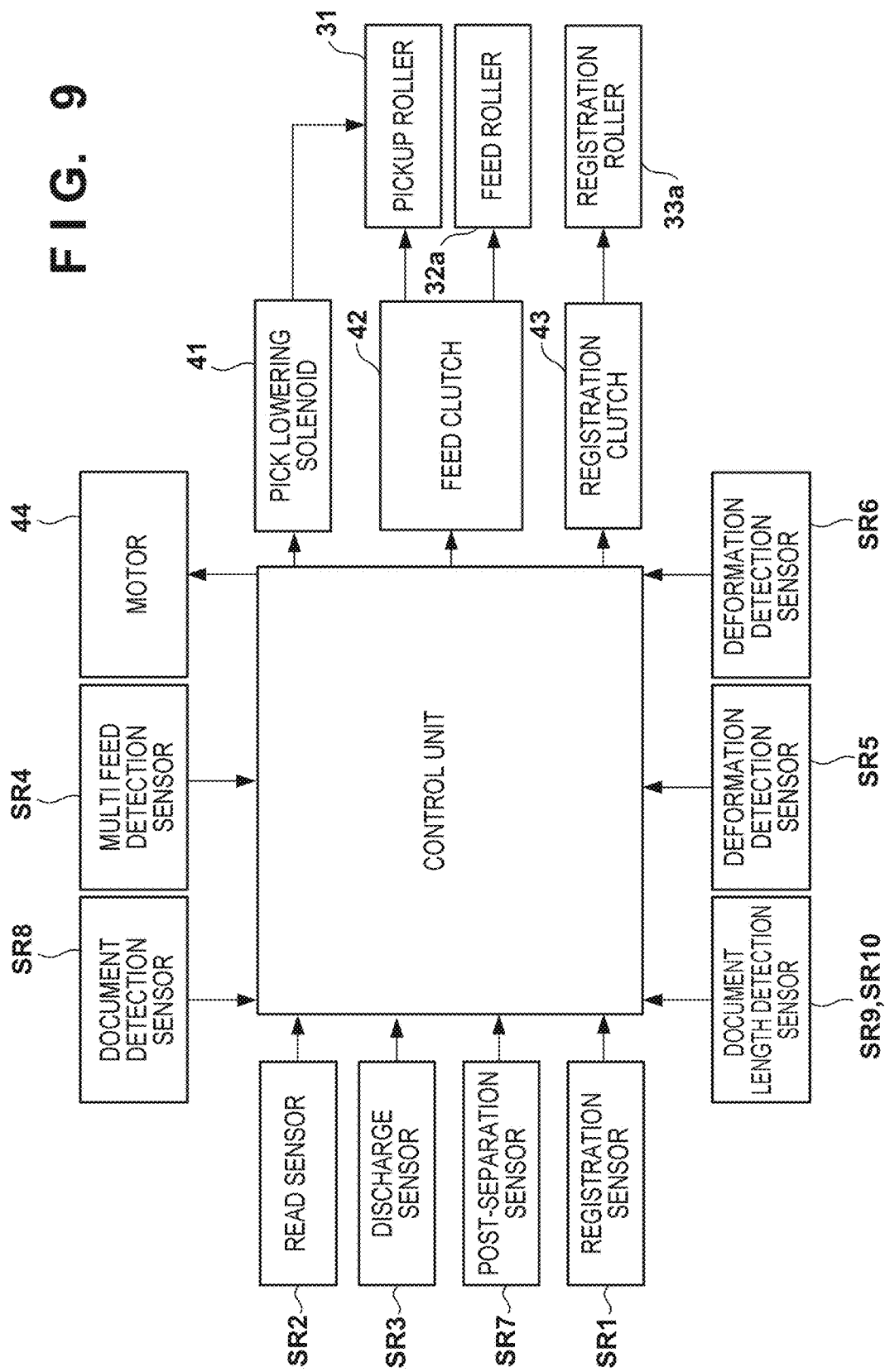
FIG. 9 is a block diagram of a control unit.

A control system provided in the feeding device 2 will be described with reference to FIG. 9. The control circuit of the feeding device 2 is formed with a control unit 40 as the main component. The control unit 40 is, for example, a microcomputer including a CPU, a memory for storing data and programs to be executed by the CPU, and an interface to an external device. The detection units SR1 to SR10 are connected to the input ports of the control unit 40. A motor 44, a pick lowering solenoid 41, a feed clutch 42, and a registration clutch 43 are connected to the output ports. The motor 44 includes various kinds of motors. The various kinds of motors include, for example, motors serving as the driving sources of the pickup roller 31, the feed roller 32a, and the registration roller 33a or 33b and the motor 25a. In this embodiment, an arrangement in which the pickup roller 31, the feed roller 32a, and the registration roller 33a or 33b are driven by a common conveyance motor is assumed.

The pick lowering solenoid 41 is a solenoid configured to lower the pickup roller 31. The pickup roller 31 is biased to the rising position by a spring (not shown). When the pick lowering solenoid 41 is driven, the pickup roller 31 lowers to the lowering position and abuts against the document D stacked on the stacking unit 30. The feed clutch 42 is an electromagnetic clutch that interrupts the driving force of the conveyance motor to the feed roller 32a and the pickup roller 31. The registration clutch 43 is an electromagnetic clutch that interrupts the driving force of the conveyance motor to the registration roller 33a or 33b.

Figure 12:
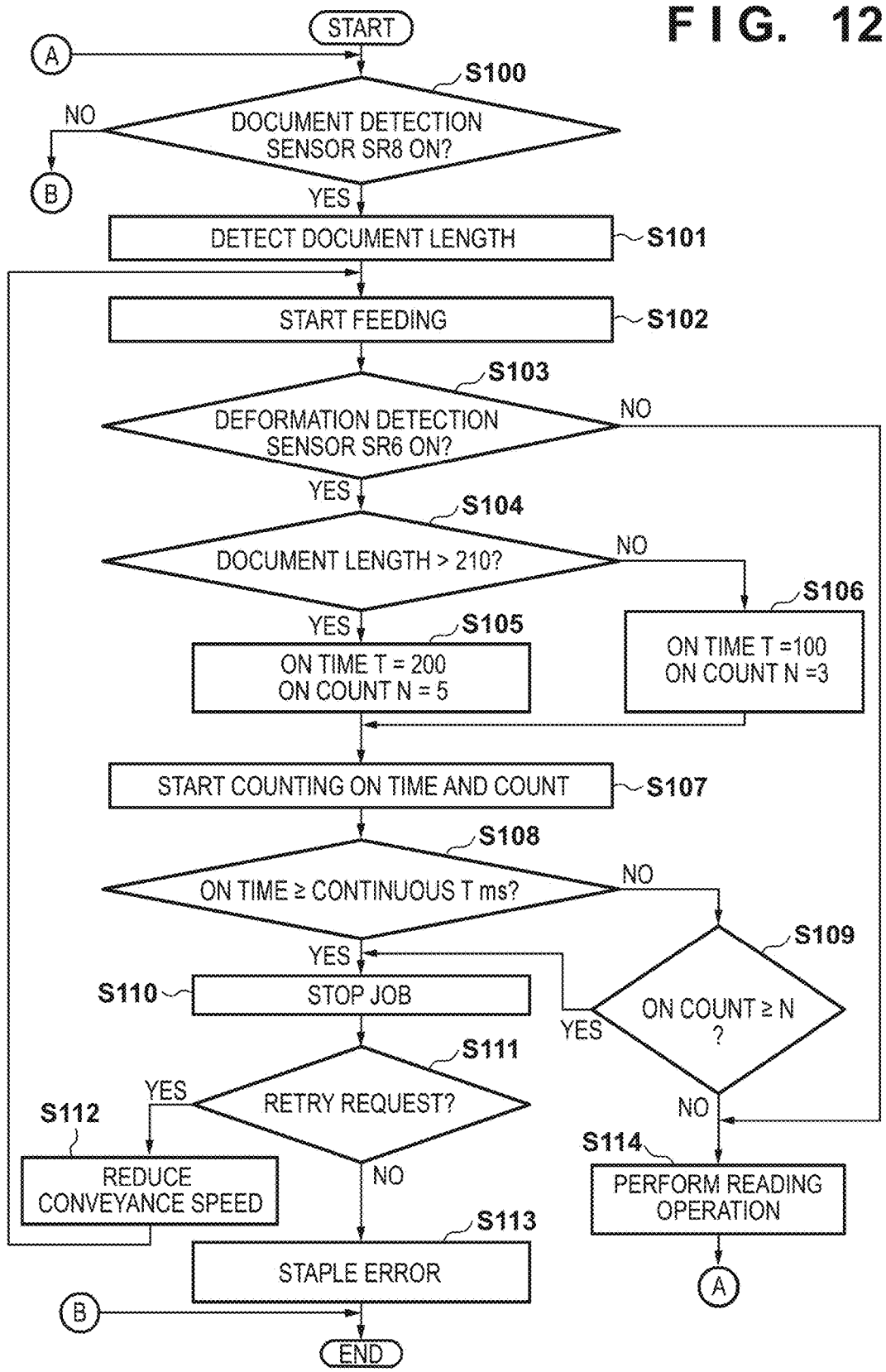
FIG. 12 is a flowchart showing an example of control.

An example of feed control executed by the control unit 40 will be described with reference to FIG. 12. Control to make a discrimination between a bundle of documents and a folded document based on the detection result of the detection unit SR6 and switch processing in a case in which the document D is fed from the stacking unit 30 to the downstream side of the conveyance unit 33 will be exemplified here.

When the user sets the document D on the stacking unit 30, and the document detection sensor SR8 detects the document (step S100), in step S101, the document length is detected based on the detection results of the document length detection sensors SR9 and SR10. The size is determined as small if only the detection unit SR9 is ON or as large if both the detection units SR9 and SR10 are ON, as described above. In step S102, feeding is started. More specifically, the pick lowering solenoid 41 is driven to lower the pickup roller 31 and abut it against the uppermost document D stacked on the stacking unit 30. In addition, the feed clutch 42 is connected to transmit the driving force of the conveyance motor to the pickup roller 31 and the feed roller 32a, and feeding is started.

If the deformation detection sensor SR6 detects a floating of the document D during conveyance of the document D, the process advances to step S104. If a floating is not detected, the process advances to step S114 to perform a reading operation. In steps S104 to S106, the conditions to discriminate between a bundle of documents and a folded document are set based on the detection result of step S101. Here, a discrimination is made depending on whether the document length is 210 mm or more (whether the size is small or large). If the size is large (not less than 210 mm), the process advances to step S105 to set the continuous ON time T serving as a threshold to 200 msec and set the intermittent ON count N to 5. If the size is small (less than 210 mm), the process advances to step S106 to set the continuous ON time T serving as a threshold to 100 msec and set the intermittent ON count N to 3. At this time, as for the document size determination, if both the detection units SR9 and SR10 are ON in step S101, it is determined that the document length is 210 mm or more, and the size is large. If only the detection unit SR9 is ON, it is determined that the document length is less than 210 mm, and the size is small. In step S107, measurement of the continuous ON time T and the intermittent ON count N of the deformation detection sensor SR6 is started.

In step S108, it is determined whether the continuous ON time T is equal to or more than the threshold set in step S105 or S106. If the continuous ON time T of the deformation detection sensor SR6 is equal to or more than the threshold, the document is determined to be a bundle of bound documents, and the process advances to step S110. If the continuous ON time T of the deformation detection sensor SR6 is less than the threshold, the process advances to step S109. In step S109, it is determined whether the intermittent ON count N within a predetermined time is equal to or more than the threshold set in step S105 or S106. If the intermittent ON count N of the deformation detection sensor SR6 is equal to or more than the threshold, the document is determined to be a bundle of bound documents, and the process advances to step S110. If the intermittent ON count N of the deformation detection sensor SR6 is less than the threshold, the document is determined to be a folded document, and the process advances to step S114.

In this embodiment, the discrimination between the bundle of documents and the folded document is made based on two conditions, that is, the continuous ON time T and the intermittent ON count N of the deformation detection sensor SR6. However, the discrimination may be done based on only the continuous ON time T. However, if the discrimination is done based on the two conditions, the detection accuracy can further be improved.

In step S110, control to stop the job is performed. In this control, for example, the feed clutch 42 is disconnected to cut off the transmission of the driving force of the conveyance motor to the feed roller 32a. The conveyance of the document D by the separation unit 32 thus stops.

In step S111, it is determined whether the user inputs a retry request. If a retry request is input, the process advances to step S112 to reduce the conveyance speed of the document D. Then, the process returns to step S102 to perform feeding again. If a retry request is not input, the process advances to step S113 to perform processing associated with a staple error, and the processing ends. In step S113, for example, the retard roller 32*b* may be separated from the feed roller 32*a* by the driving unit 25. In addition, the user is notified of the occurrence of the error. The notification can be made by a voice or display by a display device.

In step S114, the reading operation is executed. After that, the process returns to step S100. If the document detection sensor SR8 detects the next document, the same processing as described above is performed. If the next document is not detected, the processing ends.

As described above, even with the arrangement for detecting the floating of a document, it is possible to suppress an error of detecting a folded document as a bundle of documents bound by a staple or the like and accurately detect the bundle of bound documents.

In addition, since such a detection error can be prevented, reading can be done by a normal flow reading operation without stopping conveyance of a folded document. It is therefore possible to prevent conveyance of a folded document capable of normally being read from stopping and prevent the user from being promoted to set the document again.

Although conveying the documents D by the separation unit 32 is stopped based on the detection result of the detection unit SR6 in the first embodiment, conveying sheets can be stopped in the whole apparatus 1 when the bundle of bound documents is detected. In this case, each conveying section in the apparatus 1 can simultaneously be stopped, or each conveying section in the apparatus 1 can be stopped in order from a conveying section which is conveying a sheet. In a case that there is a sheet which is normally conveyed at the downstream side of the sheet-conveying position of the separation unit 32 when the conveying documents D by the separation unit 32 should be stopped, each conveying section in the apparatus 1 can be stopped after discharging the sheet.

Second Embodiment

Figure 13A:
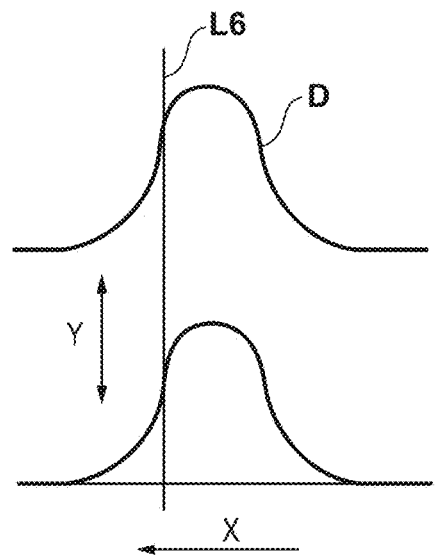
FIG. 13A is an explanatory view of the detection accuracy of a detection unit.
Figure 13B:
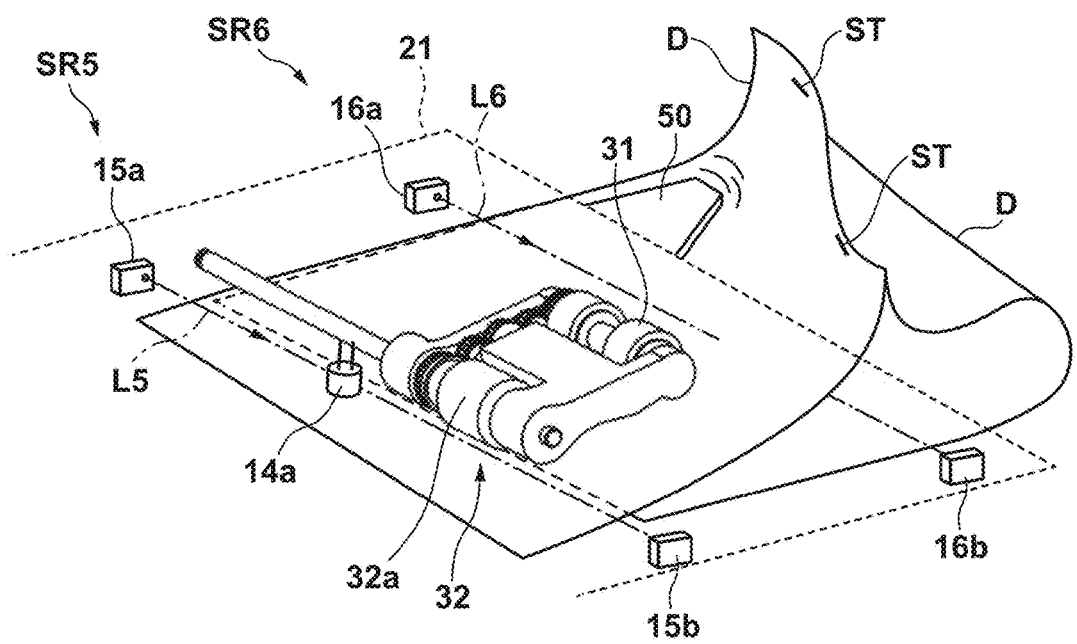
FIG. 13B is an explanatory view of a guide member.

A guide member configured to guide a deformation of a sheet passing through a separation unit 32 may be provided. FIGS. 13A and 13B show an example of a guide member 50. The guide member 50 is provided on a cover member 21.

<Guide Member>

The guide member 50 will be described. The guide member 50 is provided to guide a deformed portion of a sheet passing through the separation unit 32 into an orientation corresponding to detection by a detection unit SR6. In this embodiment, since the detection unit SR6 is a photosensor, the deformed portion of the sheet is guided such that it crosses an optical path L6. This will be described in detail with reference to FIGS. 13A and 13B.

If the trailing edge in the conveyance direction is bound by a plurality of staples ST along the edge, as shown in FIG. 6A, the end of the bundle of documents floats in a wavy pattern almost evenly in the widthwise direction, as shown in FIG. 7A, and the planar direction of a floating document D becomes almost parallel to a widthwise direction Y. In a case in which the optical path L6 is almost parallel to the widthwise direction Y, if the document D is thin, the document D may be unable to sufficiently interfere with light on the optical path L6, the detection unit SR6 may be unable to detect the floating of the document D, and the bundle of documents may be passed. FIG. 13A schematically shows a case in which the optical path L6 is parallel to the widthwise direction Y. As shown in FIG. 13A, if the optical path L6 is almost parallel to the widthwise direction Y, the planar direction of the document D and the optical path L6 are almost parallel, and the light on the optical path L6 may not be shielded by the document D.

The guide member 50 obliquely tilts the portion that floats in a loop shape to make the planar direction of the document D cross the optical path L6 so that the document D can easily shield the light on the optical path. This can improve the accuracy of detecting the deformation of the document D. When the accuracy of detecting the deformation of the document D improves, conveyance of the bundle of bound documents can correctly be stopped. It is therefore possible to prevent damage to the bundle of documents.

FIG. 13B shows the guide form of the deformed portion of the document D by the guide member 50. In this embodiment, the guide member 50 is a plate-shaped member projecting from the end of the cover member 21 to the upstream side (the side of a stacking unit 30) in the sheet-conveyance direction. The guide member 50 is located at a position closer to a lateral side than the center of a conveyance path RT1 (or to a lateral side than the center of a stack surface 30*a*), and abuts against an end of a bundle of documents deformed into a loop shape and traveling in the conveyance direction. When the end of the bundle of documents, which floats in a wavy pattern almost evenly in the widthwise direction, abuts against the guide member 50, traveling is relatively delayed on the abutting side but relatively progresses on the non-abutting side. As a result, the floating portion tilts with respect to the widthwise direction. The position of the guide member 50 can be set such that, for example, it abuts against a region corresponding to ¼ of the width of the document D from one side edge of the document D in the widthwise direction.

As a result, the planar direction of the document D crosses the optical path L6, the light on the optical path is shielded by the document D, and the floating of the document D is detected by the detection sensor SR6.

Although the guide member 50 promotes to detect the floating of the document D by the detection sensor SR6, a folded document may be erroneously detected as a bundle of bound documents. However, a bundle of bound documents can be precisely detected by discriminating between a bundle of documents and a folded document based on the detection time or the detection count as the first embodiment. Further, since such an erroneous detection can be prevented, the flow reading mode can be conducted without stopping conveying a folded document. It is therefore possible to prevent conveyance of a folded document capable of normally being read from stopping and prevent the user from being promoted to set the document again.

The guide member 50 may be provided independently of the cover member 21. However, when the guide member 50 is provided using the cover member 21, the number of parts can be reduced. When the guide member 50 is formed integrally with the cover member 21, the number of parts can further be reduced.

The guide member 50 can have any shape as long as the deformed portion of the document D can be guided in the above-described way, and the arrangement point can also appropriately be changed. In this embodiment, the guide member 50 is provided for the detection sensor SR6. However, a guide member having the same function as the guide member 50 may be provided for another detection sensor.

In addition, the guide member 50 can be applied to a sensor other than a transmission-type photosensor like the detection unit SR6. In this case as well, it need only guide the deformed portion of the sheet to improve the detection accuracy of the sensor.

Modification of Second Embodiment

In the control according to the first embodiment, if a bundle of documents bound on the trailing edge is detected by the detection unit SR6, the separation unit 32 is stopped to stop feeding of the bundle of documents. The user can open the cover member 21 and extract the bundle of documents. However, the guide member 50 projects from the end of the cover member 21 and may therefore be an obstacle when the user extracts the bundle of documents. For example, the loop portion of the bundle of documents may be caught on the guide member 50. If the cover member 21 is forcibly opened in this state, the bundle of documents may be damaged.

Figure 14:
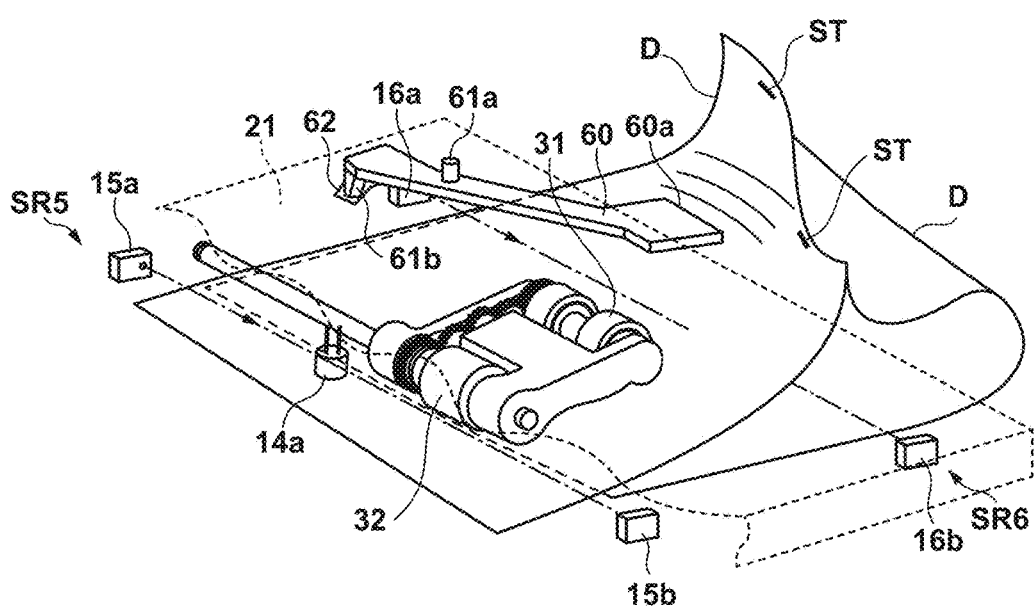
FIG. 14 is an explanatory view of a guide member according to another example.

FIG. 14 shows an example of the arrangement of a guide member 60 according to a modification. The guide member 60 has, at one end, an abutting portion 60a that abuts against the document D. The abutting portion 60a forms a movable member that can reciprocally move in the conveyance direction of the sheet. The guide member 60 is movable. For this reason, when the user opens the cover member 21 and extracts the bundle of documents, the abutting portion 60a is retreated to the side of the cover member 21, thereby avoiding a situation in which the guide member 60 becomes an obstacle when opening the cover member 21.

Figure 15A:
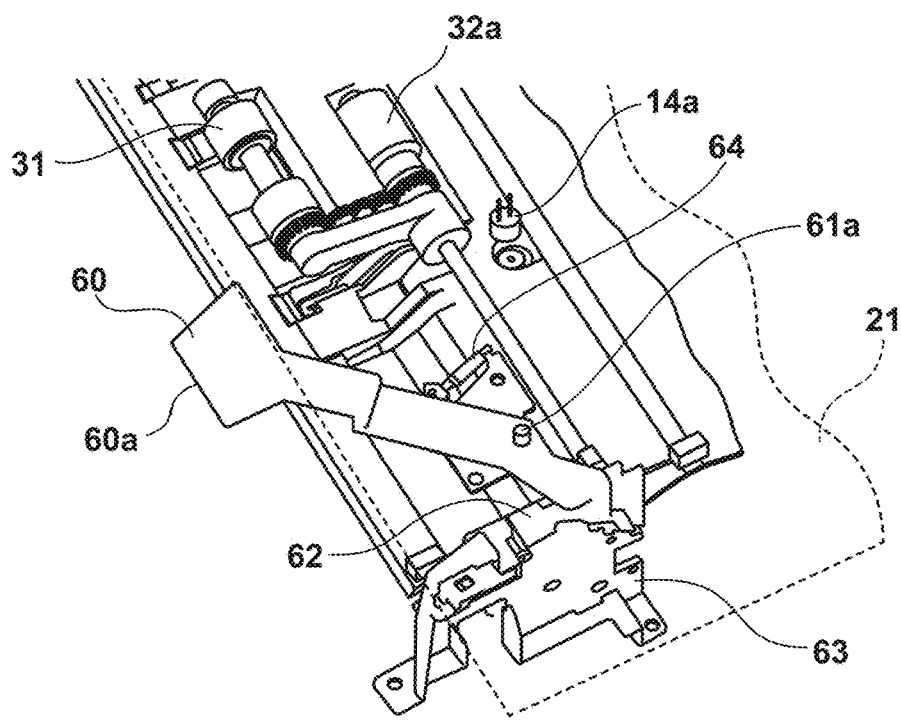
FIGS. 15A and 15B are explanatory views of the operation of the guide member according to another example.
Figure 15B:
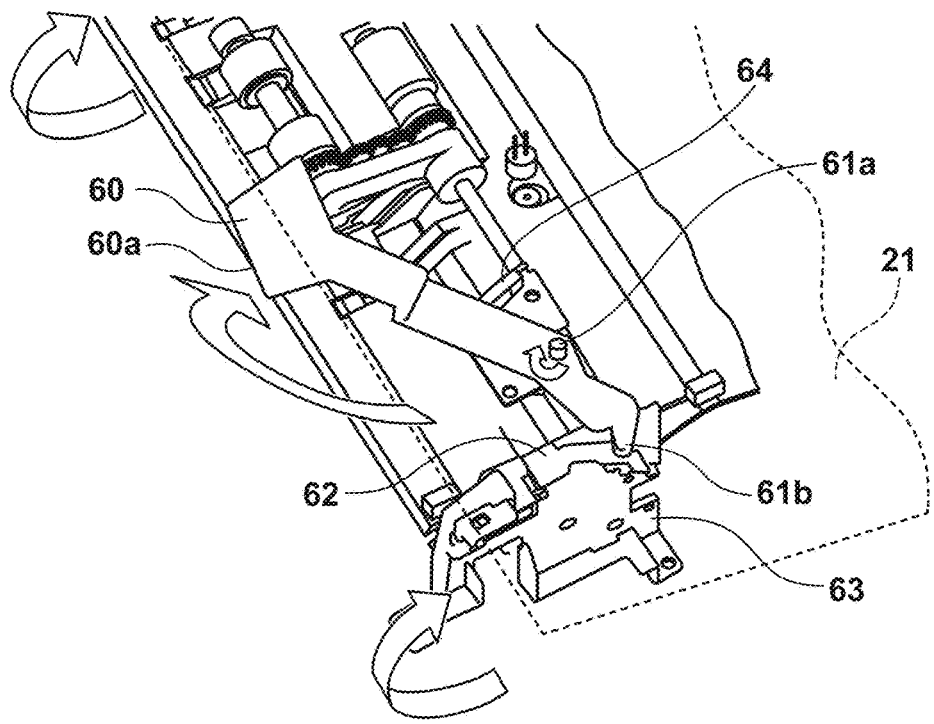
Figure 16A:
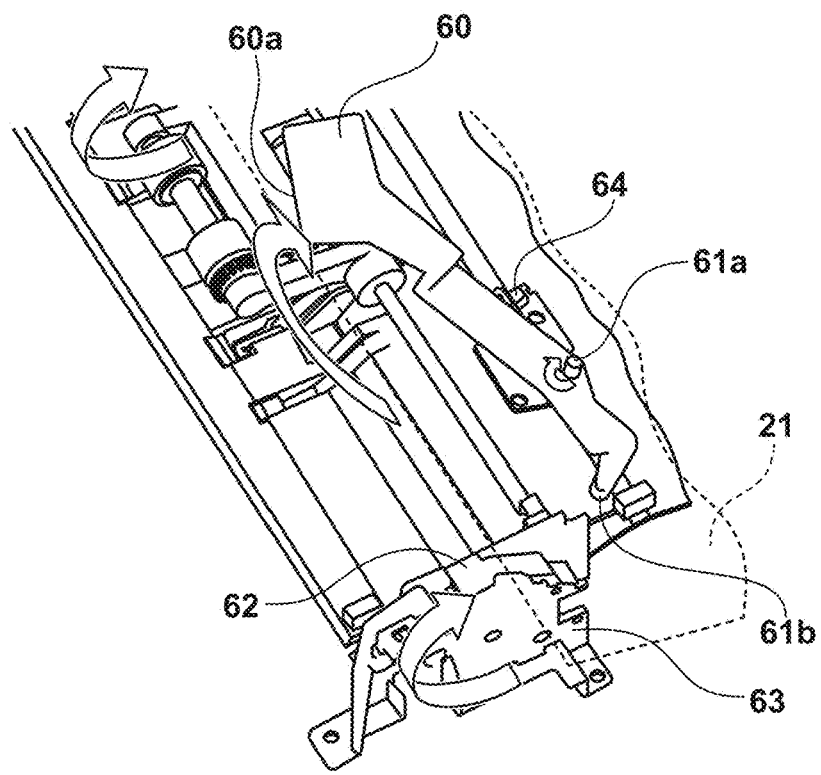
FIGS. 16A and 16B are explanatory views of the operation of the guide member according to another example.

In the modification, the guide member 60 is configured to move coordinately with the opening operation and the closing operation of the cover member 21. Hence, the user can displace the guide member 60 without separately operating the cover member 21 and the guide member 60. The structure will be described below with reference to FIGS. 15A to 17B in addition to FIG. 14. FIGS. 15A to 16A are operation explanatory views showing the operation of the guide member 60 obliquely from above through the cover member 21. FIG. 15A shows a case in which the cover member 21 is closed. FIG. 15B shows a state in which the cover member 21 starts opening. FIG. 16A shows a state in which the cover member 21 is slightly opened. FIGS. 16B to 17B are operation explanatory views showing the operation of the guide member 60 from the outside of the feeding device 2. FIGS. 16B to 17B correspond to the states of the cover member 21 shown in FIGS. 15A to 16A, respectively.

The guide member 60 is pivotally supported by the cover member 21 at an axial portion 61a. The guide member 60 may be configured to translate in the conveyance direction. However, when the guide member 60 is configured to pivot, the abutting portion 60a can be moved more largely by a smaller moving amount (pivot amount) of the guide member 60. A projecting portion 62 projecting downward is formed at the other end of the guide member 60. The projecting portion 61b is provided to abut against a leaf spring 62 supported by a frame 63 of the main body 20.

The leaf spring 62 tilts obliquely downward in the conveyance direction of the sheet, and applies a biasing force in the conveyance direction to the projecting portion 61b abutting against the leaf spring 62. By this biasing force, the guide member 60 is given a pivotal habit in a direction in which the abutting portion 60a projects from an end of the cover member 21.

On the other hand, a coil spring 64 is provided between the guide member 60 and the cover member 21. By the biasing force of the coil spring 64, the guide member 60 is given a pivotal habit in a direction in which the abutting portion 60a retreats from the end of the cover member 21 into the apparatus.

Figure 16B:
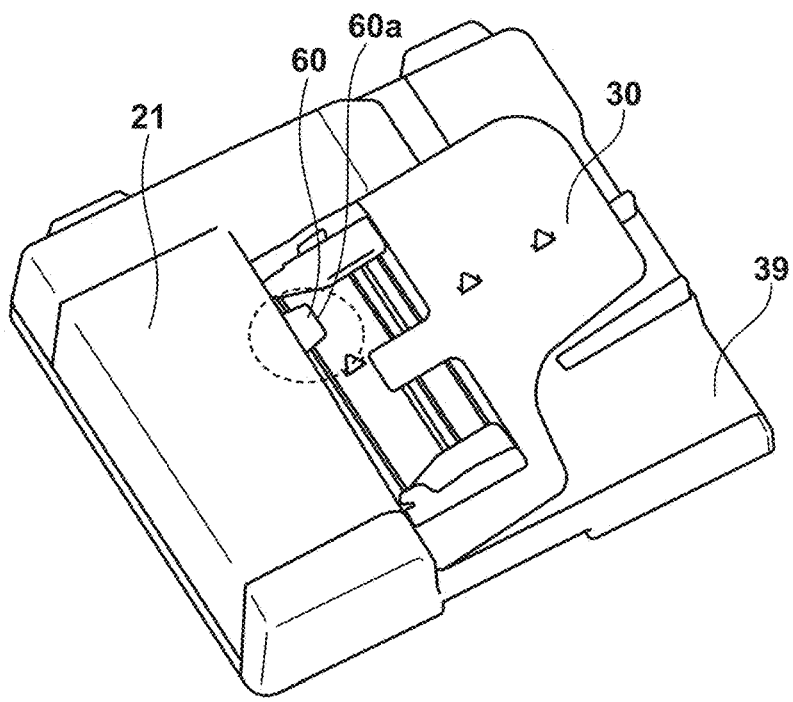

The behavior of the guide member 60 coordinated with the opening operation of opening the cover member 21 from a closed state will sequentially be explained. FIGS. 15A and 16B show a case in which the cover member 21 is in a closed state. In this state, the projecting portion 61b abuts against the leaf spring 62. The biasing force of the leaf spring 62 is set to be larger than that of the coil spring 64, and the abutting portion 60a projects from the end of the cover member 21. In this state, the abutting portion 60a functions like the guide member 50 according to the first embodiment, and guides the deformed portion of the sheet into an orientation corresponding to detection by a detection unit SR6.

Figure 17A:
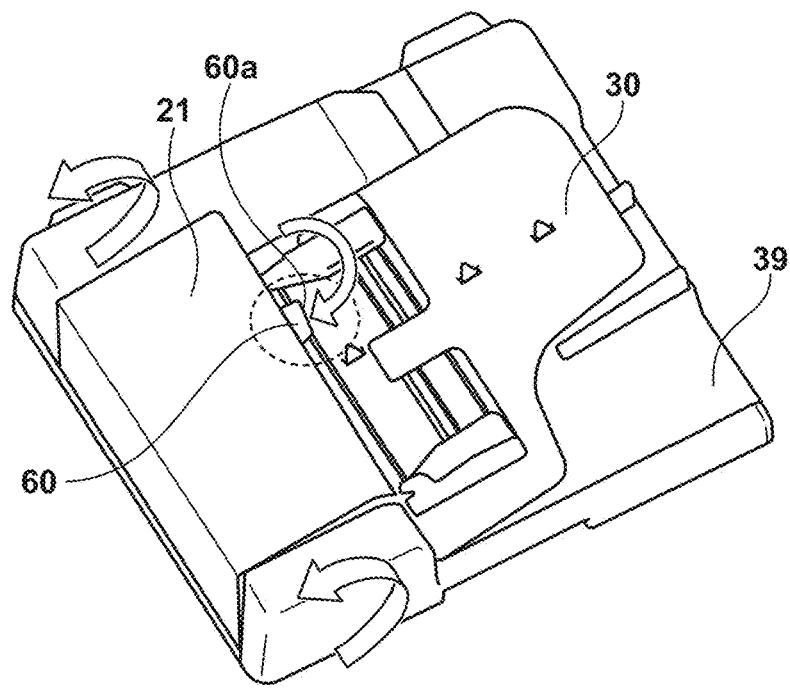
FIGS. 17A and 17B are explanatory views of the operation of the guide member according to another example.

FIGS. 15B and 17A show a case in which the cover member 21 starts opening. If the cover member 21 starts opening, the guide member 60 starts separating upward from the main body 20. For this reason, the projecting portion 61b starts separating from the leaf spring 62, the biasing force of the leaf spring 62 stops acting on the projecting portion 61b, and the biasing force of the coil spring 64 becomes larger. For this reason, the guide member 60 starts pivoting as shown in FIG. 13B, and the abutting portion 60a starts retreating from the end of the cover member 21 to the downstream side.

Figure 17B:
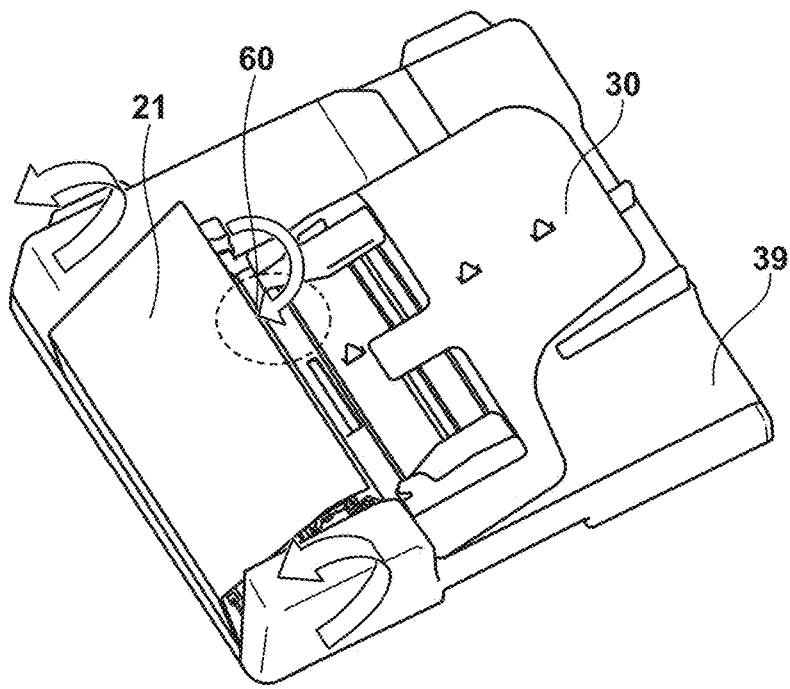

FIGS. 16A and 17B show a state in which the cover member 21 is slightly opened, that is, a state in which the opening of the cover member 21 has progressed as compared to the state shown in FIGS. 15B and 17A. The projecting portion 61b is completely separated from the leaf spring 62, and the pivotal movement of the guide member 60 further progresses by the biasing force of the coil spring 64. The abutting portion 60a retreats from the end of the cover member 21 into the apparatus.

In this way, the guide member 60 pivots coordinately with the opening operation of the cover member 21, and the abutting portion 60a retreats. For this reason, even if the bundle of documents is caught on the abutting portion 60a, the catch is eliminated automatically by opening the cover member 21. If the cover member 21 is returned to the closed state after removal of the bundle of documents, the projecting portion 61b abuts against the leaf spring 62 again. By the biasing force, the guide member 60 returns to the state shown in FIGS. 15A and 16B, and thus returns to the state in which the abutting portion 60a projects from the cover member 21. Note that the above-described moving mechanism of the guide member 60 is merely an example, and another mechanism that exhibits the same function as described above can also be employed.

Third Embodiment

Optical paths L5 and L6 may be set in a direction to tilt with respect to a widthwise direction Y.

<Tilt of Optical Path>

Figure 18A:
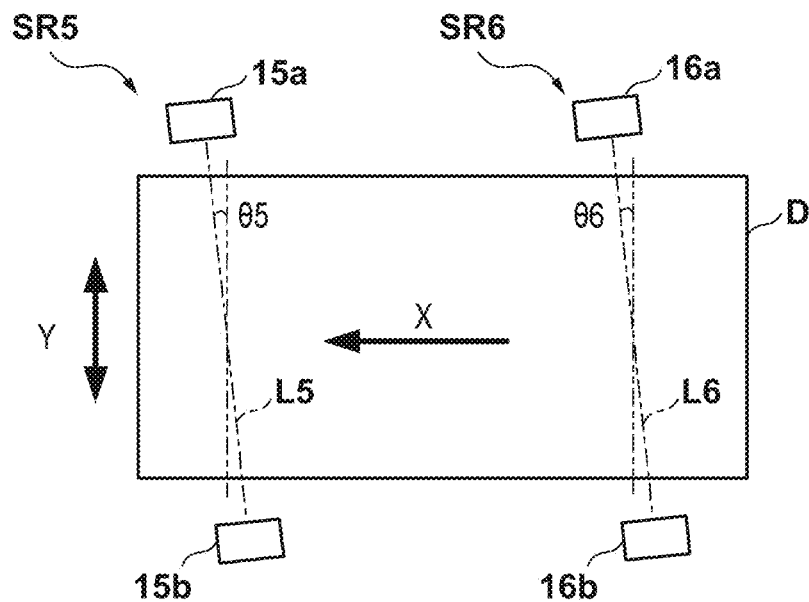
FIGS. 18A to 18C are explanatory views of a tilt of an optical path.

An advantage obtained when the optical paths L5 and L6 are tilted will be described with reference to FIGS. 18A to 18C. FIG. 18A is an explanatory view schematically showing the arrangement of light-emitting units 15a and 16a and light-receiving units 15b and 16b.

In this embodiment, the light-emitting unit 15a and the light-receiving portion 15b are arranged at positions shifted in a conveyance direction X and face each other in a direction tilting with respect to the widthwise direction Y. Hence, the optical path L5 tilts in the conveyance direction X by an angle θ5 with respect to the widthwise direction Y. Similarly, the light-emitting unit 16a and the light-receiving portion 16b are arranged at positions shifted in the conveyance direction X and face each other in a direction tilting with respect to the widthwise direction Y. Hence, the optical path L6 tilts in the conveyance direction X by an angle θ6 with respect to the widthwise direction Y.

If an end in the conveyance direction is bound by a plurality of staples ST along the edge, as shown in FIG. 6A or 6C, the end of the bundle of documents floats in a wavy pattern almost evenly in the widthwise direction, as shown in FIG. 7A or 8A, and the planar direction of a floating document D becomes almost parallel to the widthwise direction Y. In a case in which the optical paths L5 and L6 are set to be almost parallel to the widthwise direction Y, if the document D is thin, the document D may be unable to sufficiently interfere with light on the optical paths. It may be impossible to detect the floating of the document D, and the bundle of documents bound by the staples ST may be passed. On the other hand, if the optical paths L5 and L6 are tilted with respect to the widthwise direction Y, the detection ranges of detection units SR5 and SR6 widen, and the floating document D can sufficiently interfere with the light on the optical paths. As a result, the accuracy of detecting the deformation of the document can be improved independently of the thickness of the document.

Figure 18B:
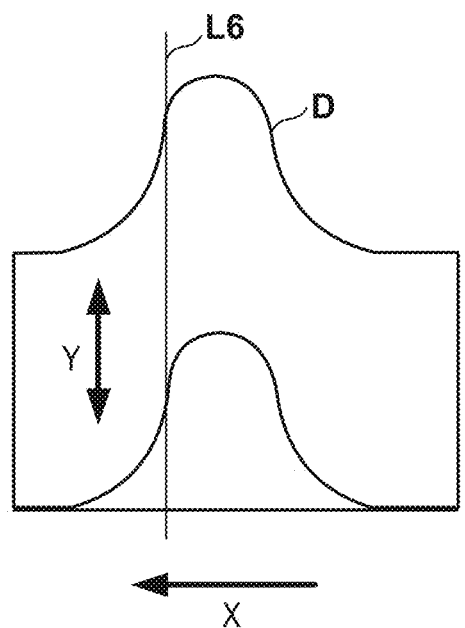
Figure 18C:
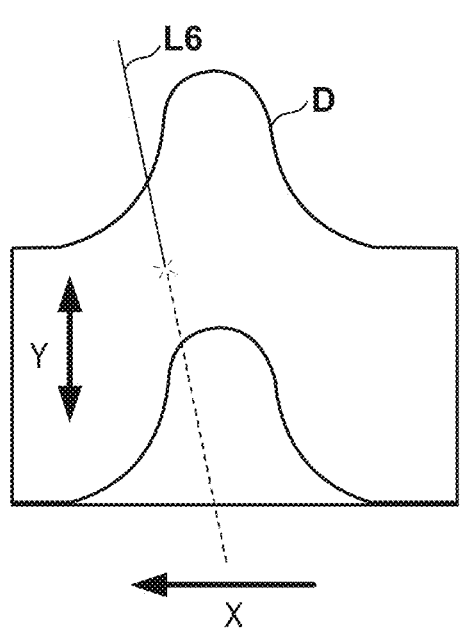

FIG. 18B schematically shows a case in which the optical path L6 is parallel to the widthwise direction Y, and FIG. 18C schematically shows a case in which the optical path L6 tilts with respect to the widthwise direction Y. As shown in FIG. 18B, if the optical path L6 is parallel to the widthwise direction Y, and optical path L6 and the planar direction of the document D that floats due to the binding become almost parallel. Even if the document D shields the light on the optical path, the detection unit may be unable to detect this, and the stapled document D may be passed. If the optical path L6 is tilted as shown in FIG. 18C, the planar direction of the document D crosses the optical path L6, and the light on the optical path is shielded more easily by the document D. The accuracy of detecting the deformation of the document D can thus be improved regardless of the thickness, and the conveyance of the bound document can be stopped.

The optical path L6 has been described with reference to FIGS. 18B and 18C. This also applies to the optical path L5. The angles θ5 and θ6 may be different or the same. If the angles θ5 and θ6 are too small, the improvement of the detection accuracy is small. If the angles are too large, a disadvantage for the sensor layout may occur. Hence, the angles θ5 and θ6 can be angles within the range of, for example, 1° (inclusive) to 45° (inclusive). At this time, lenses (not shown) configured to tilt the optical paths L5 and L6 or components used to support or arrange the light-emitting units 15a and 16a and the light-receiving units 15b and 16b to tilt the optical paths L5 and L6 are defined as optical path forming units.

In this embodiment, the direction to tilt the optical paths L5 and L6 with respect to the widthwise direction Y is the conveyance direction X. However, it may be the vertical direction. The optical paths may tilt in both the conveyance direction X and the vertical direction. In this embodiment, both the optical paths L5 and L6 are tilted. However, only one of them may be tilted.

Although tilting the optical paths L5 and L6 promotes to detect the floating of the document D by the detection sensors SR5 and SR6, a folded document may be erroneously detected as a bundle of bound documents. However, a bundle of bound documents can be precisely detected by discriminating between a bundle of documents and a folded document based on the detection time or the detection count of the detection sensor SR6 as the first embodiment. Further, since such an erroneous detection can be prevented, the flow reading mode can be conducted without stopping conveying a folded document. It is therefore possible to prevent conveyance of a folded document capable of normally being read from stopping and prevent the user from being promoted to set the document again.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-114680, filed Jun. 8, 2016, No. 2016-114683, filed Jun. 8, 2016, and No. 2016-114684, filed Jun. 8, 2016, which are hereby incorporated by reference herein in their entirety.

What is claimed is:

1. A conveyance apparatus comprising:
a separation unit configured to separate and convey a sheet;
a detection unit configured to detect a floating of the sheet passing through the separation unit;
a stacking unit configured to stack the sheet to be separated and conveyed by the separation unit;
a pickup roller configured to convey the sheet stacked on the stacking unit to the separation unit; and
a control unit configured to:
perform separate conveyance by the separation unit if the detection unit does not detect the floating of the sheet passing through the separation unit;

stop separate conveyance by the separation unit if the detection unit detects the floating of the sheet for not less than a predetermined time and/or a predetermined count; and perform separate conveyance by the separation unit if the detection unit detects the floating of the sheet for less than the predetermined time and/or the predetermined count, wherein the detection unit detects the floating of the sheet on an upstream side of a sheet-conveying position of the pickup roller with respect to a conveyance direction of the sheet.

2. The apparatus according to claim 1, wherein the control unit switches the predetermined time in accordance with a length of the sheet.

3. The apparatus according to claim 1, wherein the control unit stops the separate conveyance by the separation unit if a detection count of the detection unit within the predetermined time is not less than the predetermined count.

4. The apparatus according to claim 1, further comprising a guide unit configured to guide the sheet such that the detection unit can detect the floating of the sheet passing through the separation unit.

5. The apparatus according to claim 4, wherein the detection unit comprises a photosensor configured to detect the floating of the sheet passing through the separation unit, and the guide unit guides the sheet such that a deformed portion of the sheet crosses an optical path of the photosensor.

6. The apparatus according to claim 5, wherein the optical path is set to extend in a widthwise direction orthogonal to the sheet conveyance direction.

7. The apparatus according to claim 5, wherein the guide unit is arranged on the upstream side of a detecting position of the detection unit with respect to the conveyance direction of the sheet.

8. The apparatus according to claim 4, wherein the guide unit is arranged at a position close to a lateral side in the widthwise direction orthogonal to the sheet conveyance direction so as to abut against a deformed portion of the sheet.

9. The apparatus according to claim 4, further comprising a cover member configured to cover the separation unit, wherein the guide unit is provided on the cover member.

10. The apparatus according to claim 9, wherein the guide unit is provided to project from the cover member to the upstream side with respect to the conveyance direction of the sheet, and is provided to reciprocally move in the conveyance direction of the sheet.

11. The apparatus according to claim 10, wherein the cover member can open/close, and the guide unit retreats to a side of the cover member coordinately with an opening operation of the cover member.

12. The apparatus according to claim 1, wherein the detection unit comprises at least one photosensor configured to detect the floating of the sheet passing through the separation unit, and the apparatus further comprises an optical path forming unit configured to form an optical path such that an optical path of the photosensor crosses the conveyance path of the sheet.

13. The apparatus according to claim 12, wherein the optical path forming unit forms the optical path such that the optical path tilts in the conveyance direction of the sheet with respect to a widthwise direction of the conveyance path.

14. The apparatus according to claim 12, wherein the optical path forming unit forms the optical path such that the optical path tilts in a height direction with respect to a widthwise direction of the conveyance path.

15. The apparatus according to claim 12, wherein the photosensor comprises a light-emitting unit and a light-receiving unit, the light-emitting unit is arranged on one side of the conveyance path in a widthwise direction, the light-receiving unit is arranged on the other side of the conveyance path in the widthwise direction, and the light-emitting unit and the light-receiving unit are arranged at positions shifted in the conveyance direction of the sheet.

16. An image reading apparatus comprising:

a conveyance apparatus; and a reading unit configured to read an image of a sheet conveyed by the conveyance apparatus, wherein the conveyance apparatus comprises:

a separation unit configured to separate and convey the sheet;

a detection unit configured to detect a floating of the sheet passing through the separation unit;

a stacking unit configured to stack the sheet to be separated and conveyed by the separation unit;

a pickup roller configured to convey the sheet stacked on the stacking unit to the separation unit; and a control unit configured to:

perform separate conveyance by the separation unit if the detection unit does not detect the floating of the sheet passing through the separation unit;

stop separate conveyance by the separation unit if the detection unit detects the floating of the sheet for not less than a predetermined time and/or a predetermined count; and perform separate conveyance by the separation unit if the detection unit detects the floating of the sheet for less than the predetermined time and/or the predetermined count, wherein the detection unit detects the floating of the sheet on an upstream side of a sheet-conveying position of the pickup roller with respect to a conveyance direction of the sheet.

17. An image forming apparatus comprising:

an image reading apparatus; and an image forming unit configured to form an image read by the image reading apparatus on a printing medium, wherein the image reading apparatus comprises:

a conveyance apparatus; and a reading unit configured to read an image of a sheet conveyed by the conveyance apparatus, and the conveyance apparatus comprises:

a separation unit configured to separate and convey the sheet;

a detection unit configured to detect a floating of the sheet passing through the separation unit;

a stacking unit configured to stack the sheet to be separated and conveyed by the separation unit;

a pickup roller configured to convey the sheet stacked on the stacking unit to the separation unit; and a control unit configured to:

perform separate conveyance by the separation unit if the detection unit does not detect the floating of the sheet passing through the separation unit;

stop separate conveyance by the separation unit if the detection unit detects the floating of the sheet for not less than a predetermined time and/or a predetermined count; and perform separate conveyance by the separation unit if the detection unit detects the floating of the sheet for less than the predetermined time and/or the predetermined count, wherein the detection unit detects the floating of the sheet on an upstream side of a sheet-conveying position of the pickup roller with respect to a conveyance direction of the sheet.

18. A conveyance apparatus comprising:

a separation unit configured to separate and convey a sheet;

a detection unit comprising at least one photosensor and configured to detect a floating of the sheet passing through the separation unit, the photosensor comprising a light-emitting unit and a light-receiving unit;

an optical path forming unit configured to form an optical path such that an optical path of the photosensor crosses a conveyance path of the sheet; and a control unit configured to:

perform separate conveyance by the separation unit if the detection unit does not detect the floating of the sheet passing through the separation unit;

stop separate conveyance by the separation unit if the detection unit detects the floating of the sheet for not less than a predetermined time and/or a predetermined count; and perform separate conveyance by the separation unit if the detection unit detects the floating of the sheet for less than the predetermined time and/or the predetermined count, wherein, the light-emitting unit is arranged on one side of the conveyance path in a widthwise direction, the light-receiving unit is arranged on the other side of the conveyance path in the widthwise direction, and the light-emitting unit and the light-receiving unit are arranged at positions shifted in the conveyance direction of the sheet.

* * * * *